United States Patent
Alexander et al.

(10) Patent No.: US 7,269,657 B1
(45) Date of Patent: Sep. 11, 2007

(54) METHOD AND SYSTEM FOR PROVIDING A MOBILE IP NETWORK WITH NON-PATH DEPENDENT INTRA DOMAIN QUALITY OF SERVICE

(75) Inventors: Jason A. Alexander, Cedar Rapids, IA (US); Wayne A. Kraus, Marion, IA (US); Sally C. Thurman, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 430 days.

(21) Appl. No.: 10/143,236

(22) Filed: May 10, 2002

(51) Int. Cl.
*G06F 15/173* (2006.01)
*G06F 15/16* (2006.01)
*G08C 15/00* (2006.01)

(52) U.S. Cl. ............ 709/229; 709/227; 709/226; 709/238; 370/230

(58) Field of Classification Search ........ 709/220–238; 370/229–238
See application file for complete search history.

(56) References Cited

U.S. PATENT DOCUMENTS

| | | | | |
|---|---|---|---|---|
| 5,712,981 | A * | 1/1998 | McKee et al. | 709/241 |
| 6,104,705 | A * | 8/2000 | Ismail et al. | 370/260 |
| 6,130,880 | A * | 10/2000 | Naudus et al. | 370/235 |
| 6,473,398 | B1 * | 10/2002 | Wall et al. | 370/229 |
| 6,501,760 | B1 * | 12/2002 | Ohba et al. | 370/395.42 |
| 6,529,475 | B1 * | 3/2003 | Wan et al. | 370/231 |
| 6,571,286 | B2 * | 5/2003 | Fisher et al. | 709/224 |
| 6,587,457 | B1 * | 7/2003 | Mikkonen | 370/356 |
| 6,678,252 | B1 * | 1/2004 | Cansever | 370/253 |
| 6,680,948 | B1 * | 1/2004 | Majd et al. | 370/401 |
| 6,765,905 | B2 * | 7/2004 | Gross et al. | 370/389 |
| 6,795,421 | B1 * | 9/2004 | Heinonen et al. | 370/338 |
| 6,823,395 | B1 * | 11/2004 | Adolfsson | 709/242 |
| 6,839,321 | B1 * | 1/2005 | Chiruvolu | 370/320.1 |
| 6,894,991 | B2 * | 5/2005 | Ayyagari et al. | 370/325 |
| 6,901,440 | B1 * | 5/2005 | Bimm et al. | 709/223 |
| 7,006,449 | B2 * | 2/2006 | Teraoka | 370/252 |
| 7,054,946 | B2 * | 5/2006 | Tindal et al. | 709/232 |
| 2001/0025310 | A1 * | 9/2001 | Krishnamurthy et al. | 709/223 |
| 2002/0013856 | A1 * | 1/2002 | Garcia-Luna-Aceves et al. | 709/238 |
| 2002/0071052 | A1 * | 6/2002 | Itoh et al. | 348/384.1 |
| 2002/0073193 | A1 * | 6/2002 | Nordstrom et al. | 709/223 |
| 2002/0163883 | A1 * | 11/2002 | Price | 370/229 |
| 2003/0099212 | A1 * | 5/2003 | Anjum et al. | 370/328 |
| 2004/0022266 | A1 * | 2/2004 | Greis et al. | 370/467 |

OTHER PUBLICATIONS

Keith Kim, Petros Mouchtaris, Sunil Samtani, Rajesh Tapade and Larry Wong, Telcordia Technologies, "A Bandwidth Broker Architecture For VoIP QoS".

Keith Kim, Petros Mouchtaris, Sunil Samtani, Rajesh Tapade and Larry Wong, Telcordia Technologies, "A Bandwidth Broker Architecture For VoIP QoS", Jul. 2001.

* cited by examiner

*Primary Examiner*—David Wiley
*Assistant Examiner*—Joseph E. Avellino
(74) *Attorney, Agent, or Firm*—Nathan O. Jensen; Kyle Eppele

(57) ABSTRACT

A system and method for providing quality of service (QoS) service over a mobile IP network with dynamic domains, multiple or distributed QoS managers per domain and/or with network congestion feedback being used to establish an estimated total domain bandwidth which is used for regulating access to a domain.

20 Claims, 41 Drawing Sheets

METHOD AND SYSTEM FOR PROVIDING A MOBILE IP NETWORK WITH NON-PATH DEPENDENT INTRA DOMAIN QUALITY OF SERVICE

The U.S. Government has a paid-up license in this invention and the right in limited circumstances to require the patent owner to license others on reasonable terms as provided for by the terms of the contract number DMB07-01-C-L522 awarded by the United States Army.

FIELD OF THE INVENTION

The present invention generally relates to computer networks, and more particularly relates to internet protocol (IP) networks, and even more particularly relates to methods and systems for providing quality of service capabilities on a mobile IP network.

BACKGROUND OF THE INVENTION

In recent years, there has been an explosion of data being communicated over computer networks. At any given instant, the throughput capabilities of any IP network are fixed. If demand for access to the network exceeds the capacity of the network, then network congestion occurs. With network congestion comes delayed data delivery or, worse yet, loss of data. This can be particularly problematic if the data being sent is time sensitive and/or highly important data.

In the past, two basic technologies have been proposed to provide quality of service (QoS) over IP networks. These are Integrated Services (IntServ) and Differentiated Services (DiffServ).

One way to provide consistent QoS in a congested network is to differentiate between packets and forward some preferentially according to different priorities. If the network is fully utilized, the resources must be taken away from some packets and given to others. Even with priority forwarding, there is a limit to the amount of traffic that can be handled at each priority level without introducing delay. Admission control is the process of limiting the amount of traffic admitted at each QoS to that for which the specified parameters can be met. IntServ and DiffServ differ in how these two variables, priority and admission control, are used to provide QoS.

IntServ is based on reserving resources per flow at each router along a specific path. Usually the Resource Reservation Protocol (RSVP) is used to set up these reservations. Each router is typically responsible for managing admission to its own resources. Typically, each router must then inspect every received packet to determine which reserved flow, if any, it is a part of. Each packet is given a priority, valid only within that router, based on the reservation state of that flow in that router.

While this approach has advantages in that as long as the reserved path remains unchanged, the specified QoS can be met with a high degree of precision, it also has some serious disadvantages. It is dependent on the data packets following a specific fixed path. If the data packets venture outside of this fixed path, QoS is lost until resources are reserved along the new path. There are also serious scalability problems inherent in requiring each router in the network to maintain a detailed table of all QoS flows that pass through it. This is both an issue of the size of this flow table and the execution time to search the table to identify to which flow each incoming packet belongs. IntServ thus offers a precise control of QoS in a network that is static or very slowly changing.

By contrast, DiffServ controls admission at the network boundaries. Once admitted, packets are marked with a DS codepoint that specifies a network wide per hop behavior (PHB) to be used by each router in forwarding the packet. Thus, admission control occurs once at the network boundary, and there is no distinction between flows internally.

While DiffServ is completely independent of path within the network and is clearly advantageous in dynamic networks, it has some drawbacks. The downside is that admission control becomes more complicated; since traffic may enter the network from many different points, some kind of centralized coordination between possible entry points is required. If the admission controller were to be cognizant of detailed network topology and traffic loading, then the admission control function would be path dependent, and little would be gained relative to IntServ. Conversely, if a more approximate scheme were adopted which did not attempt to track network topology and traffic patterns, then the level of precision of QoS would be reduced. Also, DiffServ does have the advantage that QoS is not interrupted, but it may be evenly degraded for many flows in a region of the network that exhibits a bottleneck topology or a concentrated traffic load.

Consequently, there exists a need for improved methods and systems for providing QoS on mobile IP networks in an efficient manner.

SUMMARY OF THE INVENTION

It is an object of the present invention to provide a system and method for providing QoS on a mobile IP network in an efficient manner.

It is a feature of the present invention to utilize a dynamic differentiated services domain.

It is an advantage of the present invention to provide for enhanced abilities to deal with network topologies and unbalanced traffic loads.

It is another feature of the present invention to include a distribution of multiple QoS managers (QM) about differentiated service domains in the mobile network.

It is another advantage of the present invention to achieve improved efficiency in dynamically changing differentiated service domains.

It is yet another feature of the present invention to use congestion feedback to estimate a total domain bandwidth which is used to admit into a domain only the amount of data traffic that the domain can support.

The present invention is an apparatus and method for providing QoS to mobile IP networks which are designed to satisfy the aforementioned needs, provide the previously stated objects, include the above-listed features, and achieve the already articulated advantages. The present invention is carried out in an intra-domain "path dependent-less" manner in a sense that the need to determine a precise path of data through a domain as a prerequisite to QoS has been eliminated or greatly reduced in certain applications.

Accordingly, the present invention is a system and method including a mobile IP network with: dynamic Differentiated Services domains; multiple QoS managers per domain; and/or, domain congestion feedback affected estimated total domain bandwidth access parameters.

BRIEF DESCRIPTION OF THE DRAWINGS

The invention may be more fully understood by reading the following description of the preferred embodiments of the invention, in conjunction with the appended drawings wherein.

DETAILED DESCRIPTION

Summary

Figure 8:
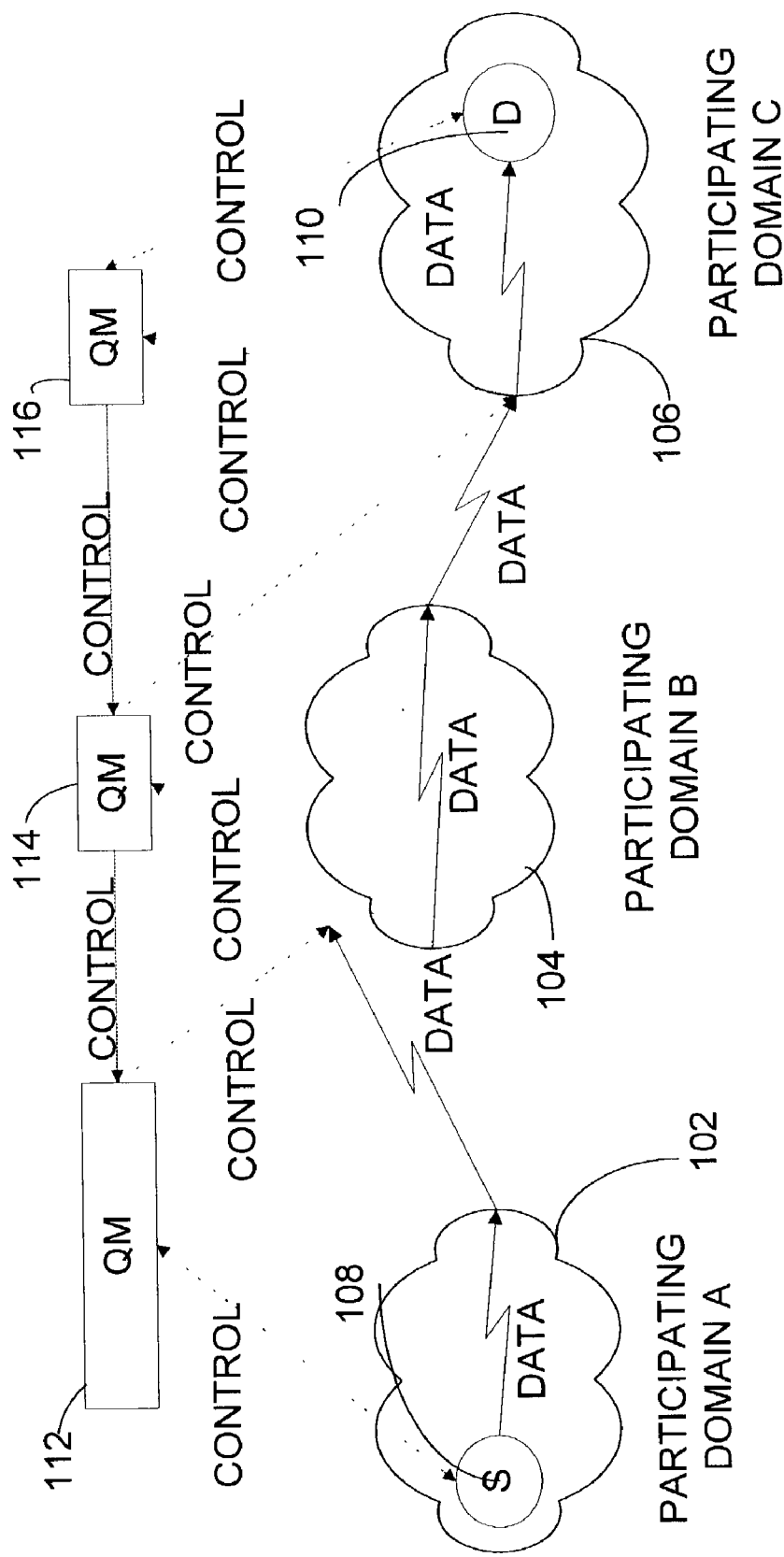
FIG. 8 is a simplified schematic diagram showing Communication Between Participating Domains.

Now referring to the Figures where like numerals refer to like matter throughout, the present invention formulates a mechanism, intermediate between IntServ and DiffServ, which attempts to provide predictable QoS while avoiding path dependence and minimizing overhead. It is tailored to dynamic, ad hoc networks. It deliberately sacrifices the precision of micro management of network resources in return for minimizing overhead. At the same time, the concept of a DiffServ domain, introduced in the literature to cover an administrative entity, is generalized into a dynamic entity, which is formed spontaneously and evolves with the network as a mechanism to deal with network topology and unbalanced traffic loads. This mechanism is hereinafter referred to as Differentiated Services with Distributed Quality of Service Managers, or DS/DQM. The system of the present invention may be best understood by referring first to FIGS. 8 and 9, which show a simplified view of portions of the network of the present invention. The text below related to FIGS. 8 and 9 helps to show the structural framework for the present invention.

1.1 DS/DQM Overview

In the DS/DQM mechanism, the network is organized into a set of domains. There are two kinds of domains: those that provide QoS by means of a Quality of Service Manager (QM) and a Request-Grant Protocol (RGP) as described in this paper, and those that do not. Those that do will be referred to as participating domains (see 102, 104, and 106 in FIG. 8). All other domains are non-participating domains (e.g. See 122 in FIG. 9). Each participating domain is a DiffServ domain in which all of the routers provide the same domain-wide set of PHBs. Traffic with QoS that enters a participating domain must have requested, and subsequently been granted, admission by an admission control entity for that domain, which in this mechanism is the QoS Manager. Any non-participating domain is able to send best effort traffic through the participating domains with no alterations. However, if this traffic is to be sent with priority, the router that is used by the traffic to enter the participating domain traps the packets and starts the request-grant protocol for that traffic. In this way, the DS/DQM mechanism is compatible with other QoS mechanisms.

It is assumed that within each participating domain, the links are roughly homogeneous, and the traffic is randomly distributed. This assumption allows the domain resources to be reasonably and accurately estimated, and then allocated by means of a single generalized domain-wide bandwidth quantity, which will be called the Total Domain Bandwidth (TDB). This number is an approximation that is initially estimated, then maintained by means of a feedback control mechanism. This mechanism adjusts the TDB in response to domain conditions to maintain QoS performance.

The main functions of the QoS Manager are to maintain the TDB and allocate bandwidth. Logically, the QoS Manager is a single function that spans the participating domain and provides admission control services. In a dynamic network, it is necessary for most domains, if not all, that this single logical function be distributed over two or more physical network entities to provide redundancy and minimize the likelihood of service interruptions.

As a flow moves through the network, it passes through a series of domains. This is referred to as the domain path. Reservations for each flow are made domain-by-domain along the domain path, in a similar fashion to the way IntServ makes reservations router-by-router.

1.2 Total Domain Bandwidth Overview

The total capacity of the domain to accept traffic, while maintaining the required Quality of Service, is estimated by the Total Domain Bandwidth. The real capacity of the domain depends upon both the domain topology and traffic profile and will be continuously varying. The TDB is intended to be a reasonable approximation to this value, and is found by making an initial estimate and then continuously adjusting it based on feedback from within the domain. For a homogeneous domain (containing either identical links or an even distribution of heterogeneous links) with randomly distributed traffic, this should result in a very good approximation. For an extremely unbalanced topology or message traffic, it would be an underestimate. We are intentionally using an approximation to avoid the complexity and high message and computational overhead of trying to micromanage a dynamic network.

The initial value of the TDB could be determined in various ways. It could be taken as an arbitrary number, such as the bandwidth of a single link, which may be a good estimate for a bus or broadcast type network medium. It could be taken as some multiple of the bandwidth of a single link or as an arbitrary starting value without reference to the actual domain. There is a tradeoff between accuracy and the overhead required for the calculation. The method of making the initial estimate is not critical, since the actual value is determined by the feedback mechanism. The initial estimate affects only the time required for the TDB to converge to a stable value.

Each router in the system monitors the usage of its output links. When a router detects congestion, for example, packets at the highest QoS are being queued, or packets at lower QoS are being discarded, it sends a congestion report to its QoS Manager. The QoS Managers maintain a table of congested links by QoS level. Since DiffServ is non-deterministic and TDB is an approximation, occasional congestion is to be expected. If persistent and non-local congestion is detected, as indicated by a large number of congestion table entries for a time period exceeding a threshold, domain wide congestion would be recognized and the TDB adjusted.

If the total reserved bandwidth is at or near the TDB value and the domain is not congested, the TDB value would be increased. Note that if the total reserved bandwidth is well within the TDB, no congestion would be expected, and no action is taken. Domain congestion when the total reserved bandwidth is less than the TDB indicates the TDB is an overestimate, and the TDB is decreased. These changes are summarized in Table 1.

TABLE 1

| | TDB Feedback Utilization | | |
|---|---|---|---|
| Congestion Reports | Under-Reserved | Fully Reserved | Over-Reserved |
| Not Received | Nothing | Increase TDB | Increase TDB |
| Received | Decrease TDB | Decrease TDB | Nothing |

It is possible that after decreasing the TDB due to congestion, the domain could be over reserved. As reservations time out or release, the reserved bandwidth will decrease. No new reservations will be granted until the total reserved bandwidth has adjusted to the new TDB figure. There will definitely be a time lag between adjustment of the TDB and the response of the domain. To prevent excessive decreasing of the TDB during this lag time, the TDB should not be decreased while the domain is over reserved.

When the domain is over-reserved, the QoS Managers have no unreserved allocation and cannot make any grants until sufficient reserved bandwidth has been released to bring the total reserved bandwidth back into alignment with the decreased TDB. The possible additional actions are:

Active termination—Enough flows are forcibly terminated to bring reserved bandwidth within the TDB.

Passive termination—No flows are forcibly terminated, but renewals are denied until reserved bandwidth is within TDB.

In both cases, it is necessary to provide a scheme for selecting which flows are to be terminated or have their renewals denied. In the case of forcible termination, it is also necessary to notify the source that its grant has been revoked, and to notify other QoS Managers along the domain path that the flow has been terminated, and all grants associated with this flow should be released.

The exact behavior when bandwidth is over reserved is a policy issue. More aggressive action reduces the response time between adjustment of the TDB and response of the total reserved bandwidth. This is achieved at the expense of those flows that are terminated, while minimizing disruption to those which are not. Less aggressive action results in a longer response time with more uniform transient degradation of all flows. The choice might be a function of QoS level; e.g., forcibly terminate flows at lower QoS to preserve flows at a higher, congested, QoS. It might also be a configurable option.

For reasons of stability, the overall rate of adjustment of the TDB should be limited. When a major change to the network topology is detected, e.g., a new QoS Manager is created, or an existing QoS Manager leaves the network, this introduces additional delay while the TDB converges to a new stable value. It is always an option to re-estimate the TDB in this case by the same method used to estimate TDB originally. As always, there is a tradeoff between accuracy and overhead.

2 Quality of Service Manager

The QoS Manager is the logical entity that controls the amount of data traffic allowed to enter the domain. A request-grant protocol is used to establish bandwidth reservations within the domains, and another protocol is used for communicating the RGP between domains. A certain amount of information is also kept by the QMs within each domain to facilitate the efficiency of these protocols.

2.1 Protocol Request-Grant

Figure 1:
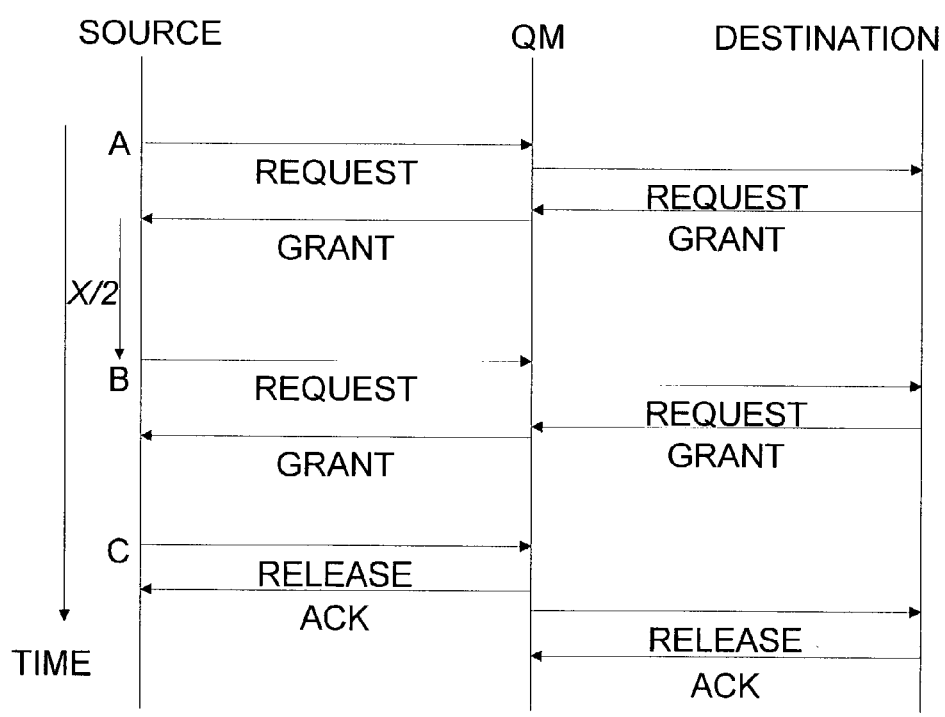
FIG. 1 is a time-based flow diagram of a Reservation of Bandwidth via the Request-Grant Protocol.

Any data that is sent into the network that desires better than best effort service must request QoS from the QoS Manager. This request becomes the first message of the RGP, which includes five different messages that are used between the source and QM to negotiate QoS. These messages are the Request, Grant, Denial, Release, and ACK messages. What follows is a simple example to introduce the Request-Grant Protocol and show how the five messages are used to complete the QoS transaction. This example is illustrated in FIG. 1.

To initiate a QoS reservation, the source must send a Request message that includes the requested QoS level and bandwidth to its QM, as demonstrated by the message sequence labeled "A". The QM then decides if the QoS requested can be given, and, if so, formats a new Request message and sends it to the destination. In this example, the destination is in the same domain as the QM, and destinations accept all Requests. Therefore, the destination immediately formats a Grant message and sends it to the source of the Request, which in this case was the QM. Upon receiving a Grant, the QM again checks to ensure the QoS can still be met, makes the reservation for that request, and then formats and sends a Grant to the data source, which was the source of the Request the QM received. This Grant is valid for a configurable amount of time, which is specified in the Grant message. For this example, this amount will be referred to as "x".

Once the source receives the Grant, a timer is set, and data packets can be sent at the granted level of QoS. When the timer is at x/2 and the source has not completed the transmission, it has the option of renewing the reservation for another x. This is done by the same procedure as the initial reservation (shown in message sequence "B"), and can be denied or accepted. If the renewal Request is denied, the source may still be able to send, using the initial Request reservation until the timer ends.

When the source completes the transmission, it should Release the reservation, as shown in message sequence "C". To complete a release, the source must send a Release to the QM the reservation was made with, which immediately replies with an ACK. The QM, in turn, sends a Release on to the destination, which also replies with an ACK. If the Release is not completed for any reason, the reservation times out and is automatically released.

Once the reservation is released, the source may no longer send packets with QoS greater than best effort unless another Request has been made and Granted.

Figure 2:
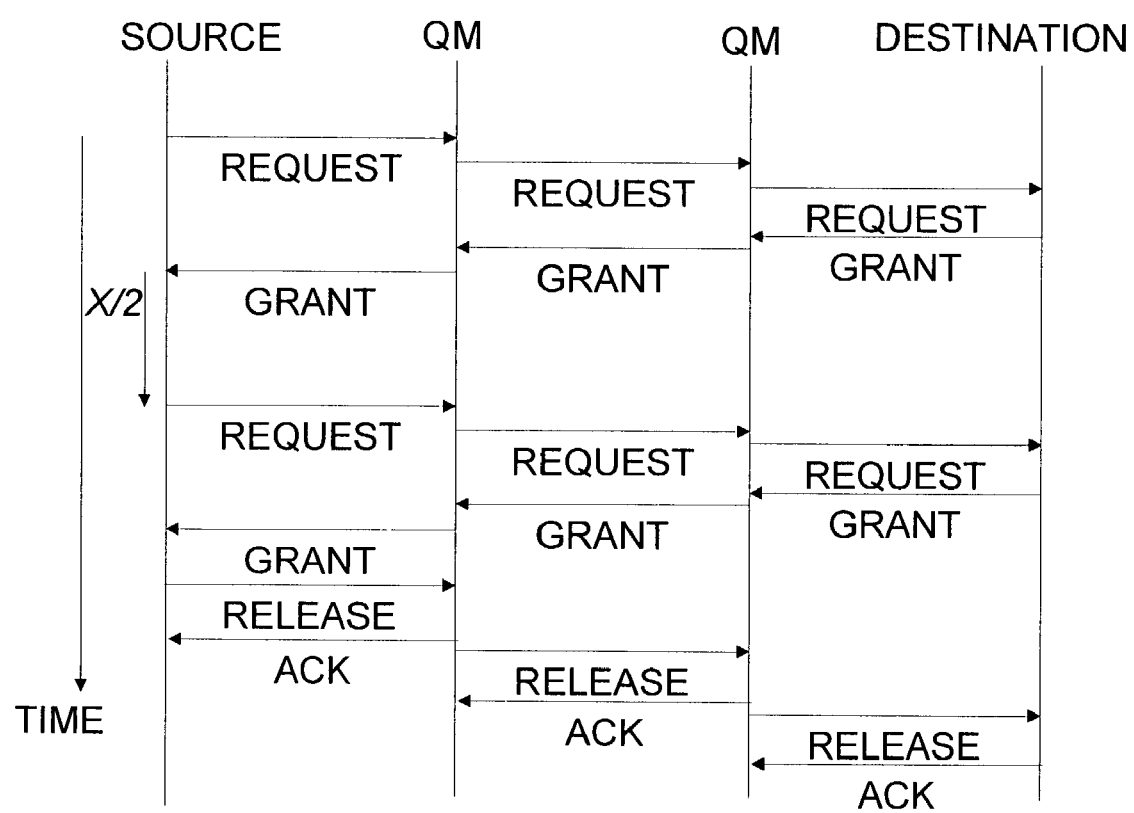
FIG. 2 is a time-based flow diagram of a Reservation of Bandwidth in Multiple Domains.

If the source and destination are not in the same domain, the Request needs to be passed through a QM in each domain that the data will travel through to ensure that there is bandwidth reserved at each point. An example where the source and destination reside in neighboring domains is shown in FIG. 2.

When the QM sends a Request out, it is addressed to the destination noted in the Request. If the Request enters another domain before reaching the destination, the entrance router to that domain traps the message and forwards it to its own QM. This QM will evaluate the Request and repeat the process, sending a new Request to the destination. When a Request reaches the destination, it responds to the Request Source with a Grant in the same way as before. When the QM receives the Grant, it again checks for availability of bandwidth, reserves the bandwidth for that Request, and then sends a Grant on to its Request Source. This continues until the Grant reaches the original Source, at which time the source is able to start sending data packets at a higher level of service.

Figure 3:
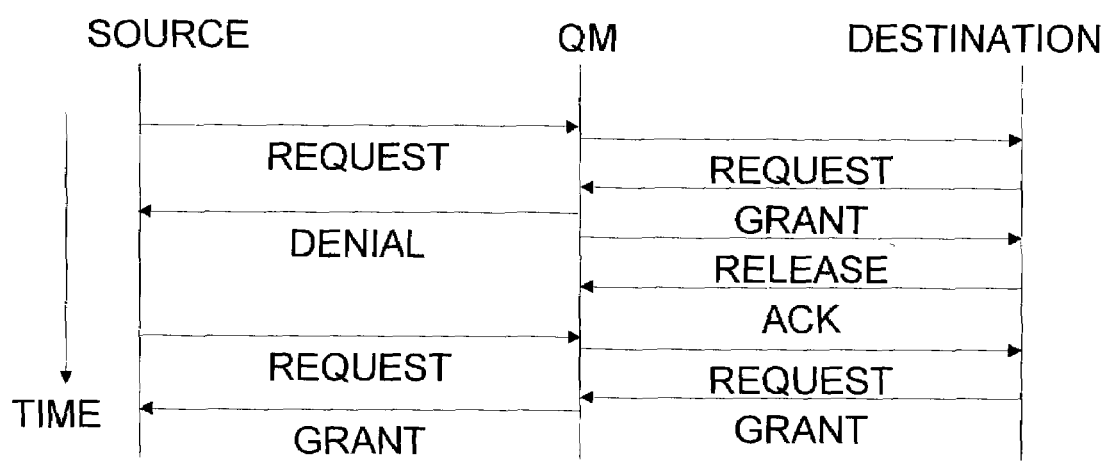
FIG. 3 is a time-based flow diagram of a Denial of Bandwidth via the Request-Grant Protocol.

Until now, it has been assumed that each QM is able to fulfill the request for a reservation of bandwidth at the QoS desired. However, it is likely that there will be requests that cannot be filled, and, therefore, are denied, as shown in FIG. 3. In the first sequence, it is assumed that each QM (just one QM is illustrated) is able to accept the Request as it is made, and the destination automatically Grants the Request. However, the QM, upon receiving the Grant, finds that it is no longer able to support that Request and so sends a Denial message to the source of the Request, and a Release back to the source of the Grant. The Denial contains a suggestion of what QoS would be available if the source made another Request. The suggested QoS could include a QoS level, an amount of available bandwidth, or both. If the source desires, it can then send a new Request with the suggested QoS parameters.

Figure 4:
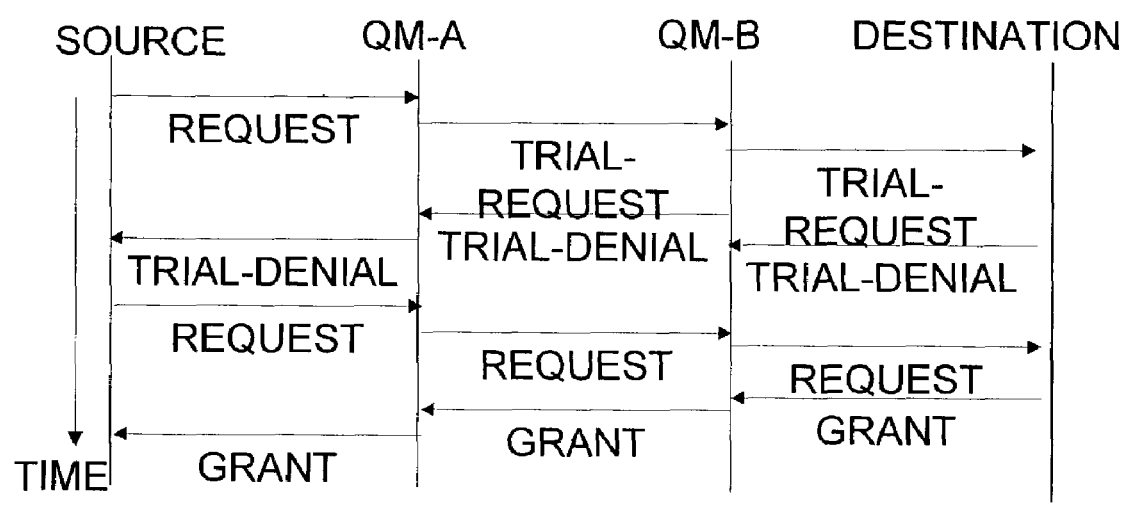
FIG. 4 is a time-based flow diagram of a Denial of Bandwidth with a Trial-Denial.

In FIG. 4, QM-A is not able to accept the Request when it is received. In this case, it sends a Trial-Request message toward the destination, and the Trial-Request is redirected to QM-B. The Trial-Request message contains the same information as the Request message, and is handled in a similar manner, except that if the QM is not able to accept the suggested bandwidth, the QM can adjust it to an acceptable level. When the Trial-Request is received by the destination, a Trial-Denial is sent as the response. The QMs handle the Trial-Denial in the same way as a Denial message, with no bandwidth reservations being made. The source responds to the Trial-Denial in the same way as the Denial. The use of a Trial-Request and Trial-Denial allows the suggested QoS to be the best suggestion, and that all the domains along the domain path would be able to support that suggestion when it was made.

Figure 5:
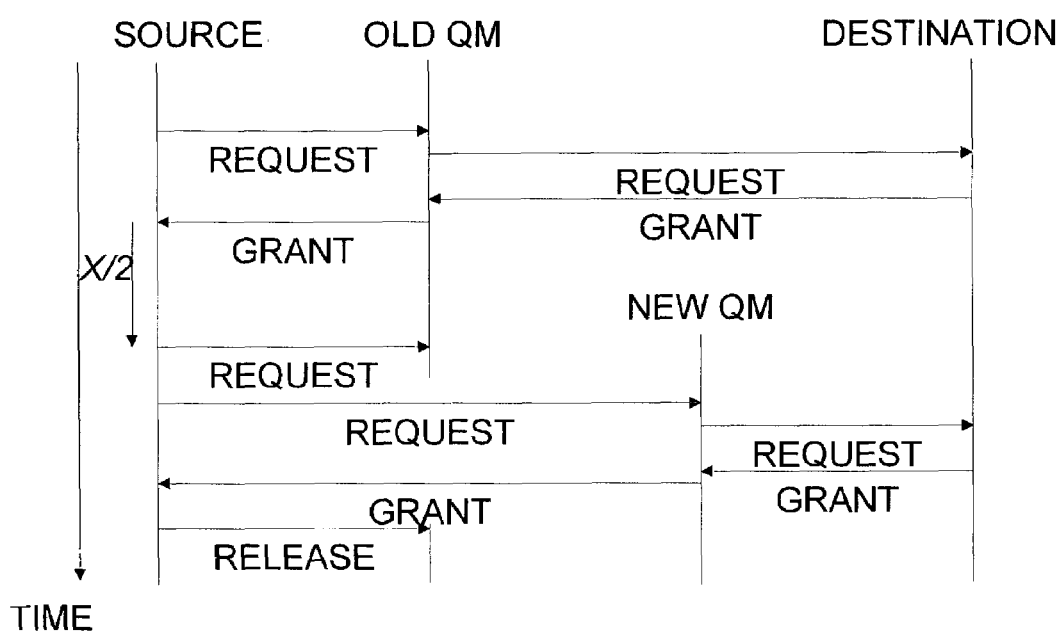
FIG. 5 is a time-based flow diagram of a Changing to a new QM during a Request.

Now that the QoS has been negotiated and reserved, it is important to consider what occurs when the Request-Grant Protocol is used in a dynamic network. If the source sends a renewing Request to the QM, and does not receive any reply, the source assumes that the QM has moved or is no longer able to communicate. The source then identifies another QM to use, via the Domain Organization protocol described in Section 3, and sends the Request to that QM, which will proceed just as described above. During this process, the source is still able to send traffic with QoS per the previous reservation until the reservation times out. If a Grant is received from the new QM prior to the old reservation expiring, the source sends a Release to the old QM. This sequence is shown in FIG. 5.

Figure 6:
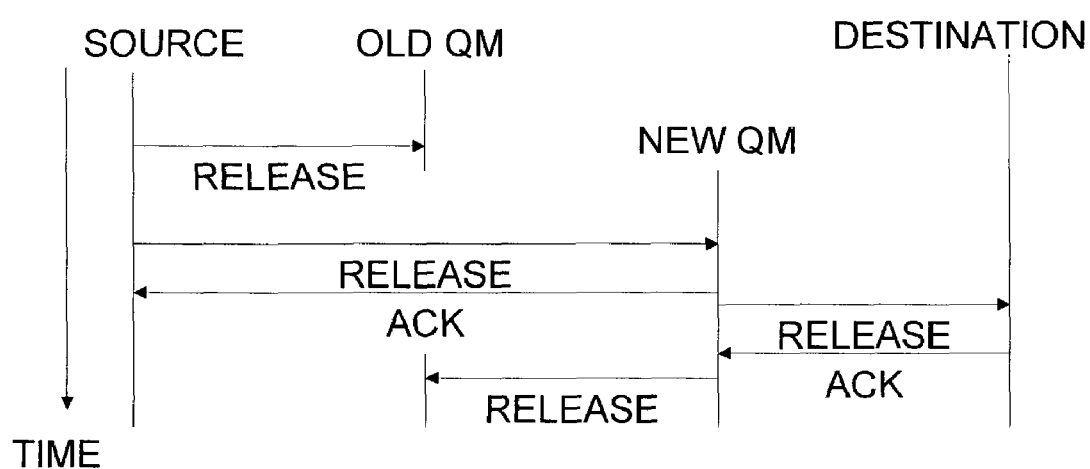
FIG. 6 is a time-based flow diagram of a Changing to a new QM during a Release.

If the QM does not respond to a Release message sent by the source, as shown in FIG. 6, the source locates another QM in the domain to send the Release to. This new QM replies to the Release with an ACK, and then sends a Release toward the destination. The new QM then sends a Release to the old QM. If the old QM still does not respond, it is assumed that the old QM has discontinued communications, and after a set amount of time (x, the amount of time reservations are good for), the bandwidth previously allocated to that QM is reallocated among the remaining QMs.

Figure 7:
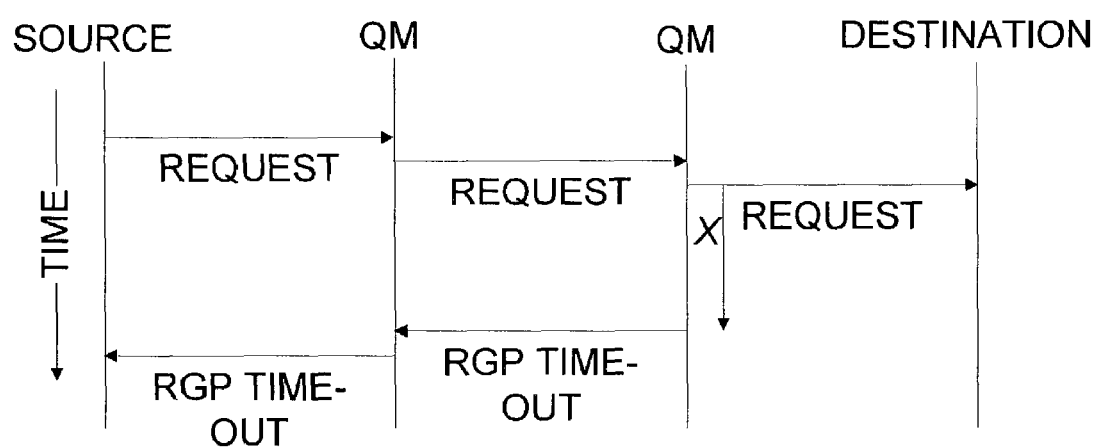
FIG. 7 is a time-based flow diagram of a Time-Out of a Request.

If the Request message times out before a response is received, it is assumed that the message has been lost. At this point, the QM sends an RGP Time-Out message to the predecessor QM on the domain path, as shown in FIG. 7. The Time-Out message includes the Reservation Identification (RID) and Request Identification (QID) numbers of the expired Request if they are known. If a QM receives an RGP Time-Out message, and the RID or QID matches that of an entry in the Reservation or Pending Request Tables, as shown in Section 2.3, the pending Request is cancelled, and a Time-Out message sent to the predecessor QM. If there is not a matching entry found, the Time-Out message is ignored.

2.2 Communication Between Domains

The network is organized into a collection of domains connected to one another by external links. Domains may be either participating or non-participating. A participating domain is defined as one for which admission is controlled by a QoS Manager by means of the Request-Grant Protocol defined in Section 2.1. All other domains are by definition non-participating domains.

The QM in a participating domain monitors domain resources and controls admission. The mechanism by which the QM implements this function may be the TDB/feedback mechanism described in Section 1.2, or any other mechanism. For the purposes of this section, it does not matter, nor must all the QMs use the same mechanism.

Each router in a participating domain must be aware of the domain to which it belongs, its QoS Manager, and whether the routers at the other ends of directly connected links lie in the same domain or some other domain, i.e., are external links. In some cases, this information might be determined by the technology. For example, in a cluster of terminals, which communicate with a base station and are incapable of communication with one another in the absence of a base station, obviously the cluster is a domain and the QoS Manager would be the base station. In other cases, the organization must be determined ad hoc and will be dynamic. For example, a flat network with no imposed hierarchy in which all routers are created equal and may talk freely to one another. In this case, the network might be organized into domains as described in Section 3. The details of how the network is organized into domains are not directly relevant to how they communicate.

The purpose of this section is to illustrate how domains interact. This includes discussion on flows spanning multiple participating domains, traffic entering a participating domain from a non-participating domain, traffic that is delivered from a participating domain into a non-participating domain, and communications that travel through multiple non-participating domains.

2.2.1 Communication Between Participating Domains

To describe the basic mechanism used to communicate between multiple participating domains, a simple example will be used. This example, shown in FIG. 8, includes a series of three participating domains 102, 104, and 106, that the data must flow through from the source 108 (labeled as network element "S") to the destination 110 (labeled network element "D"). For simplicity, a single QM is shown for each domain, although this logical function is actually distributed over multiple physical elements within the domain. Similarly, separate control paths are shown, although the control packets will actually be communicated in the same way as the data packets. This difference is to emphasize that the control packets may not be assumed to traverse the same path, or even visit the same network elements, as the data packets. Note that the data packets are not required to pass through the element that contains the QM of the domain. The control mechanism is completely independent of the path in a participating domain.

In this example, the three participating domains, A 102, B 104, and C 106, each have a QoS Manager 112, 114, and 116 respectively, and source S 108 in domain A 102 wishes to send a flow to destination D 110, in domain C 106, with some enhanced quality of service. Router S 108 initiates the process by sending a request to its QM, QM-A 112. If QM-A 112 can support the request, it generates a new request addressed to destination router D 110. However, D 110 is not in the same domain as QM-A 112, and so the Request from QM-A 112 is propagated by the routers until it enters a new domain. The first router in the new domain, domain B 104, recognizes the request as being received on an external link, which is a link on which the element on the opposite end belongs to a different domain. Because the request came in on an external link, the message is trapped, and forwarded on to that router's QM, QM-B. QM-B then handles the request in the same way it was handled by QM-A 112. This process repeats itself until a request message reaches the destination router 110.

When the destination router 110 receives a request, it determines whether it can accept the flow, and sends the response directly back to the source of the Request, which in this example is QM-C 116. QM-C 116 then sends a response to the Request it received. As described in Section 2.1, the response returns to the source 108 through each QM the Request passed through. Note that if the response is a Denial, each QM checks the suggested QoS and bandwidth and then suggests the same or lower levels according to its own ability to support the source's data flow. If the response is an Accept, each QM checks to ensure it is still able to support the flow, and if so, makes the reservation. If the QM is not able to do this, it sends a Denial to the preceding QM (toward the source) with a suggested bandwidth, and a Release to the succeeding QM (toward the destination).

It is important to understand that these messages are not being forwarded by the QMs, but instead are separate nested transactions. In this sense, the QoS Manager of each domain acts as a proxy for source S in requesting QoS from the next domain along the domain path. The mechanism described here is fully recursive and applies to any number of intermediate participating domains.

2.2.2 Communication from a Participating to a Non-Participating Domain

Figure 9:
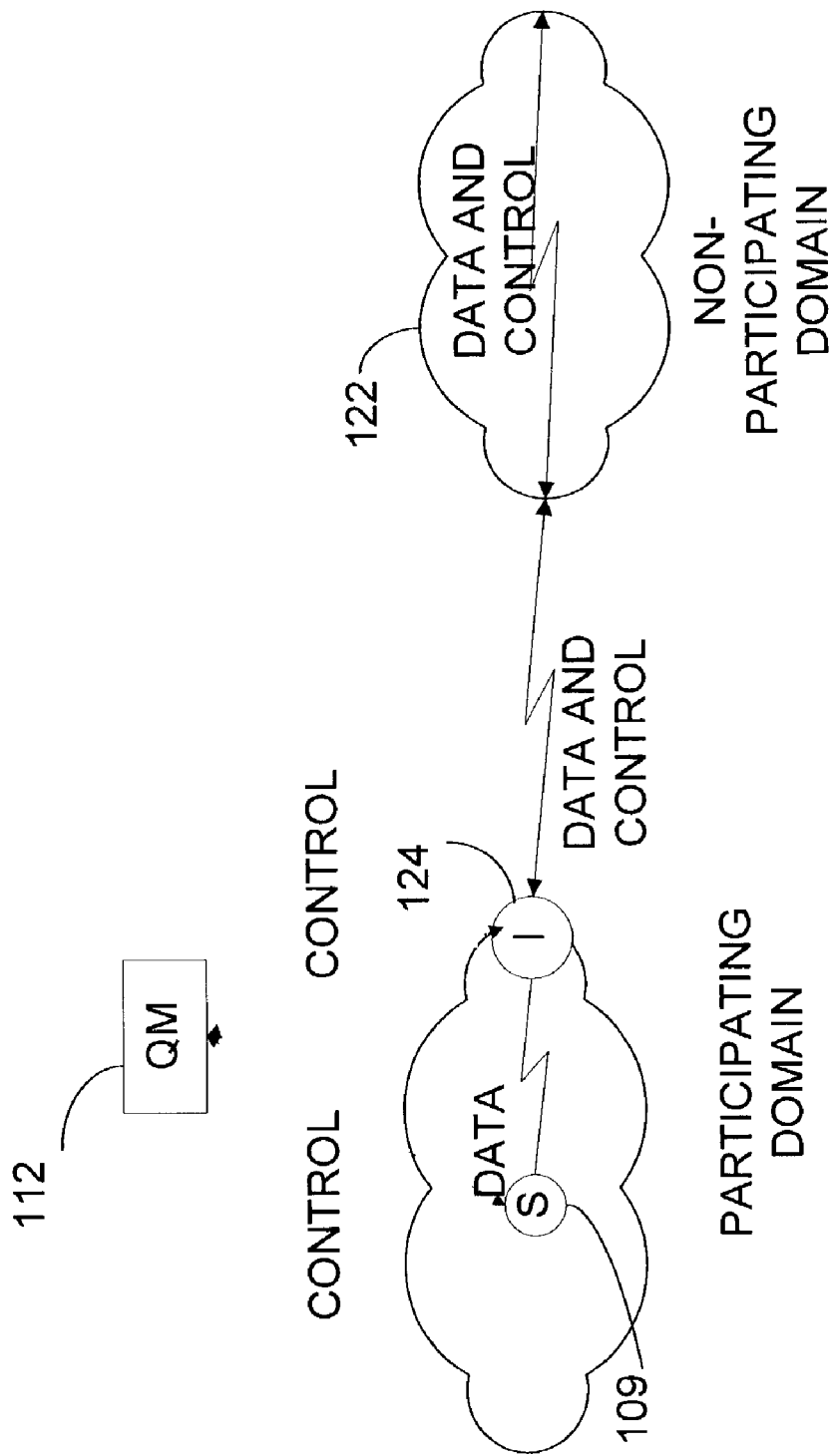
FIG. 9 is a simplified schematic diagram showing Communication from Participating Domain to Non-Participating Domain.

Now referring to FIG. 9, the pattern of control messages will be changed slightly if the destination lies in a non-participating domain, while the source still resides in a participating domain. FIG. 9 shows an example of this, with a participating domain sending traffic into a non-participating domain. It is assumed that the connection is through a special interface router I, 124, which is an element of the participating domain 109 that has been modified to interface to that non-participating domain 122. There are two possible QoS interfaces for the non-participating domain 122:

1. Simple priority—This means that the non-participating domain has either a simple priority based QoS mechanism, or no QoS mechanism at all. The non-participating domain receives packets from interface router I with a simple priority mark in each individual packet. Examples of such mechanisms would be standard DiffServ, or a non-QoS aware domain.

2. Request-Grant—This means that the non-participating domain has a QoS mechanism which involves requesting resources and waiting for the resources to be granted. It is expected that the interface router I 124 will issue this request to the non-participating domain 122, and then, if necessary, wait for a grant before sending data packets. An example of such a mechanism is standard IntServ, for which the request is a PATH message and the grant is a RESV message. Note that the QM architecture described in this document is also a request-grant mechanism.

The request from source S 109 is handled as for any other participating domain. When interface router I 124 receives a request whose next hop is determined to be the interface to the non-participating domain, it must generate a request of the type native to the non-participating domain. For example, if the non-participating domain 122 were a standard IntServ domain, the interface router would generate a PATH message directed to destination router D (see FIG. 10) and send it into non-participating domain B. Note that the request message contains the source and destination IP addresses and ports which are required to identify an individual flow.

Interface router I must then wait to receive the native response message from the non-participating domain. For example, if the non-participating domain were a standard IntServ domain, interface router I would wait for an RESV message. When this message is received, interface router I generates a corresponding grant message and sends it back to the previous QM. In this way, the grant is propagated back to the data source, which may then begin sending data packets.

Some non-participating domains may require a special flow ID to be set as an option in the IP header. In this case, the non-participating domain, or interface router I acting on its behalf, must generate such a flow ID. This flow ID is included in the grant message and propagates back to the source. The source then inserts this option field into the IP header of every packet of the identified flow. This is done because source router S and interface router I are the only two nodes where the paths of data and control packets are known to coincide. Setting the option field at the source frees interface router I from the necessity of maintaining a flow table and performing per packet look-ups. This flow ID is propagated through the participating domain as a field with an associated length, just as it will appear in the IP header option. The value chosen is transparent to the participating domain, which does not use this value. Thus, the format and nature are completely under the control of the non-participating domain.

When the non-participating domain is the other type and does not have a request-grant mechanism, the interface is much simpler. The interface router contains a mapping from the QoS levels provided by the participating domain to the priority or other levels defined for the non-participating domain. Each data packet is remarked according to these new levels and forwarded into the non-participating domain. In this case, interface router I responds to requests as the destination router, without consulting the non-participating domain.

2.2.3 Communication from a Non-Participating to a Participating Domain

Figure 10:
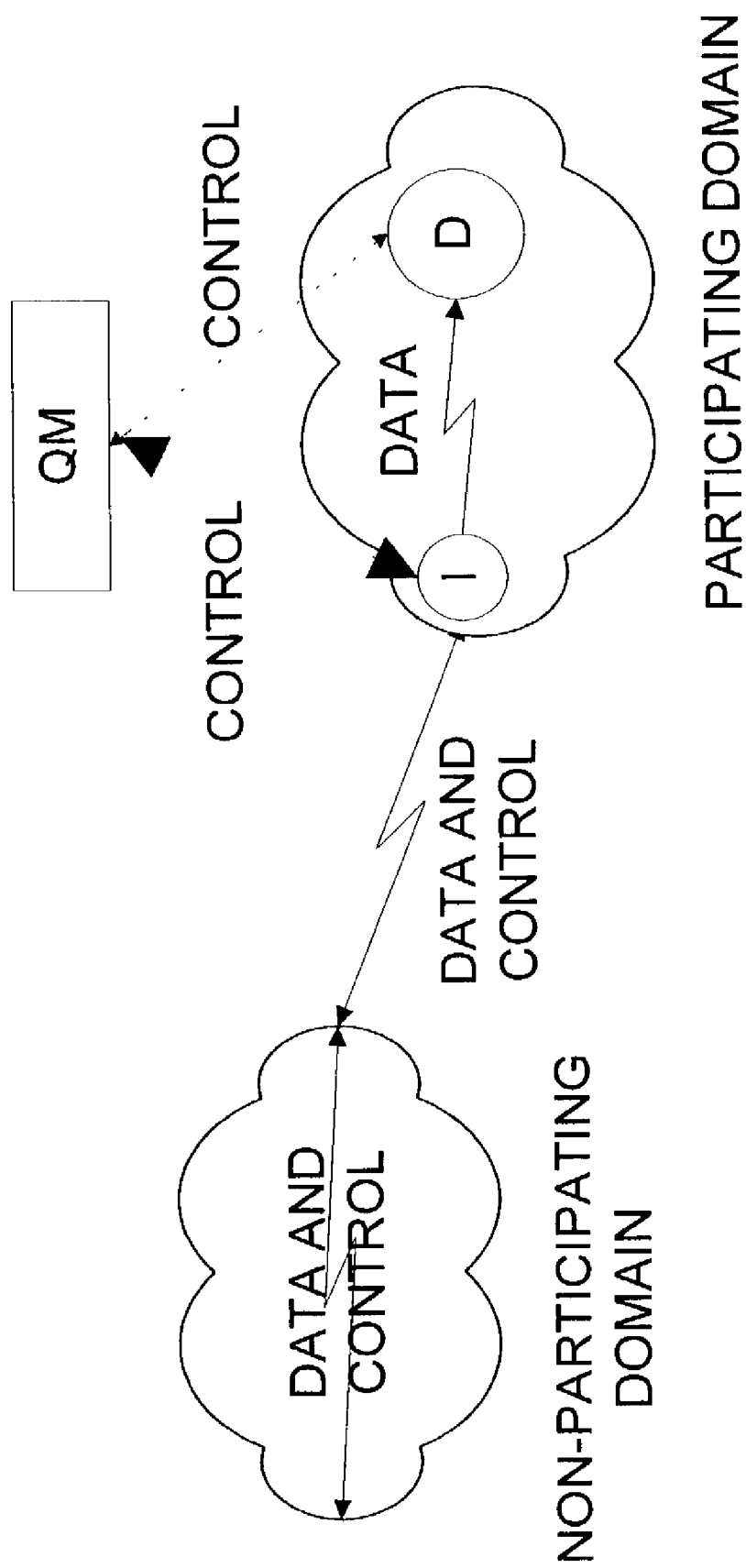
FIG. 10 is a simplified schematic diagram showing Communication from Non-Participating to Participating Domain.

Another problem to consider is what occurs when a flow enters a participating domain from a non-participating domain. FIG. 10 shows an example of this, where a non-participating domain wishes to inject traffic into a participating domain. It is assumed that the non-participating domain is connected to a special interface router I, which has been specially modified to interface to the non-participating domain. It is also assumed that the non-participating domain is one of the two types defined in Section 2.2.2, and presents either a request-grant interface or a set of priority levels.

If the non-participating router provides simple priority based QoS, interface router I becomes aware of the flow when it receives data packets from the non-participating domain. Interface router I must then determine from the packet what QoS level is appropriate and then send a Request to the QM for its domain, the participating domain shown in FIG. 10. The processing of the Request is exactly as if interface router I were the source of the flow.

Interface router I may either treat all packets received from the non-participating domain as being members of one flow, or attempt to inspect the packets and distinguish different flows. In the latter case, it must send a request to its QM for each flow it distinguishes. This is an implementation choice for the interface router. However, interface router I is not allowed to send packets with an enhanced QoS into the participating domain until it has received a grant from the QM. It may choose to either buffer the packets until a grant is received or it may forward them into the participating domain as best effort packets until the grant is received. This is an implementation choice for the interface router.

The more interesting case is when the non-participating domain itself presents a request-grant QoS interface. In this case, interface router I must recognize the request from the non-participating domain and issue a corresponding request to the QM of its domain. This is the same as when a request crosses a boundary between participating domains, except that interface router I must recognize the form of request message native to the non-participating domain. When, at a later time, it receives a grant from its QM, it must generate a native grant message into the non-participating domain. For example, if the non-participating domain is an IntServ domain, interface router I must recognize a PATH message from the non-participating domain and generate a request to the QM in the participating domain. It must also translate a grant from the QM into a corresponding RESV message to return to the non-participating domain. In this way, the interface router acts as a proxy source for members of the non-participating domain in the participating domain, while also acting as a proxy destination for the participating domain in the non-participating domain.

2.2.4 Communication Through Participating and Non-Participating Domains

Figure 11:
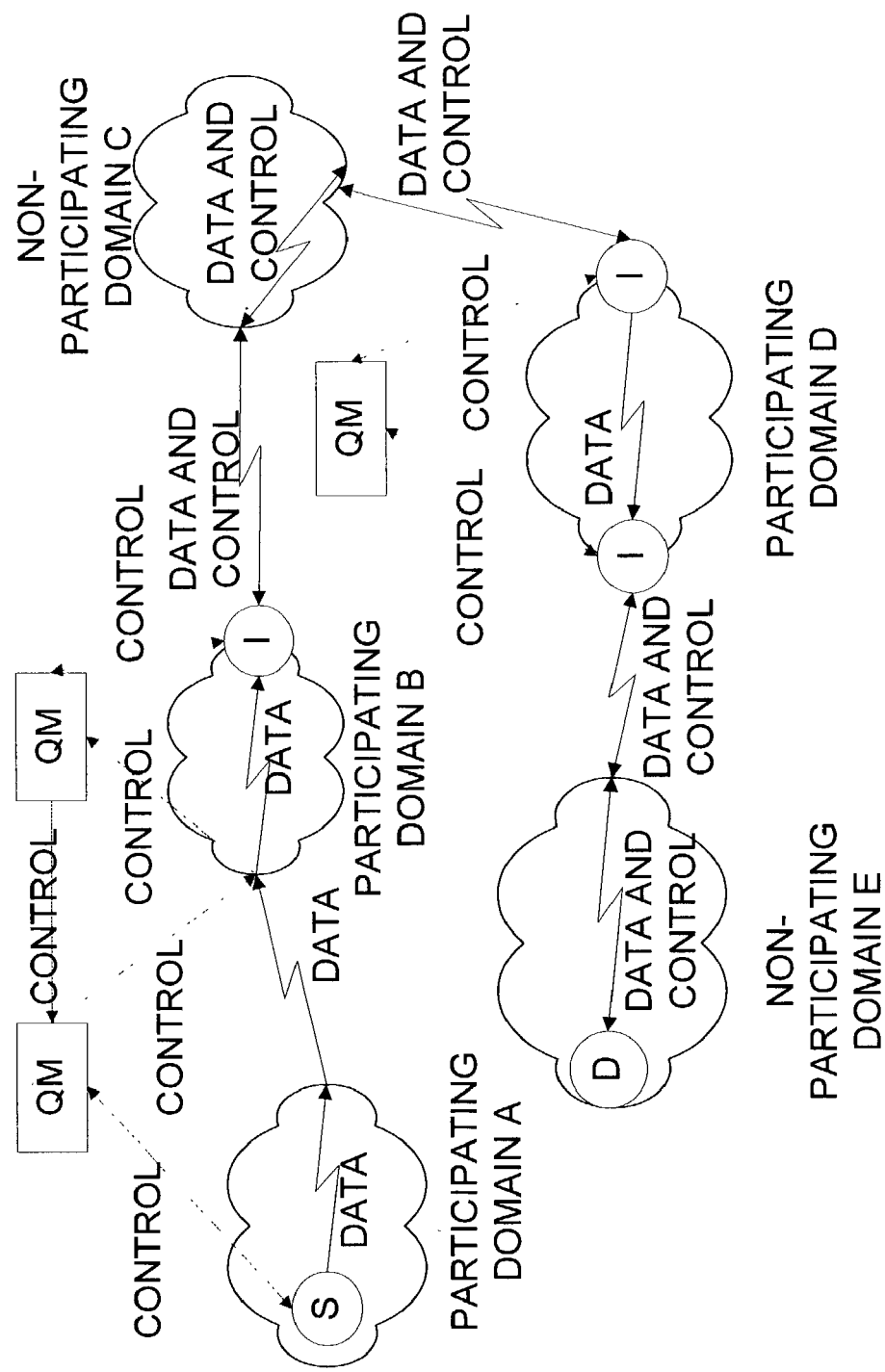
FIG. 11 is a simplified schematic diagram showing Communication through two Non-Participating Domains.

Recursive application of the mechanisms described in the previous sections is sufficient to handle all possible cases. FIG. 11 is an example that illustrates something which may not be immediately obvious. In this example, a flow originates at source S in participating domain A, transits participating domain B and arrives at interface router I to non-participating domain C. It transits non-participating domain C and enters participating domain D. It enters participating domain D through interface router I and passes through D to an interface router I connected to non-participating domain E. It passes through this interface router to non-participating domain E, in which it is routed to destination D.

If we assume non-participating domains C and E distinguish flows and present a request-grant interface, then each can generate a flow ID which must be placed in the headers of the packets which constitute that flow. This is done by the source router for each flow. For non-participating domain C, the flow being marked originates at source S, and source S will put the flow ID in each packet. For non-participating domain E, the interface router at the entry to participating domain D is the source and will put the flow ID in each packet as it enters domain D.

It is important to recognize that from the point of view of the participating domains, this example illustrates two separate and distinct flows. The first flow originates at source router S and ends at the interface router where packets exit participating domain B. When the packets enter participating domain D, they constitute a new flow. No entity within any participating domain attempts to relate flows in different parts of the network.

A participating domain considers an interface router at which a flow passes to a non-participating domain to be the effective destination. It does not matter whether the flow reaches a destination within that non-participating domain or eventually enters a different participating domain. The two cases are indistinguishable to the participating domains that contain this flow.

Likewise, when a flow enters a participating domain through an interface router, this interface router is the effective source. It does not matter whether this flow originated from a source host within the non-participating domain or originally entered the non-participating domain from some other participating domain. The two cases are indistinguishable to the participating domains that contain this flow.

It is neither necessary nor desirable for the participating domains to realize that these two flows are actually two portions of the same flow. It should be apparent from the preceding sections that it is not necessary. It is also not desirable, because the QoS mechanism in the participating domains is responsible for providing some specified level of QoS to each flow. It cannot make any provision for an "overall" flow which has passed into and back out of some non-participating domain because it has no control over the QoS received while the flow was outside the participating domains. Therefore, it is undesirable to admit the concept of such flows.

2.2.5 Path Dependence

The DS/DQM QoS mechanism could be characterized as "IntServ by domain." In this respect, it can be regarded as a modification of IntServ where the flows are kept separately, and the routers are aggregated into domains, rather than viewing the mechanism as a modified version of DiffServ. Hence, the mechanism depends explicitly on the sequence of domains through which the data flow passes, and also on passing into and out of non-participating domains through specific interface routers. However, the mechanism is independent of path within each domain, and independent of the links between two participating domains.

Thus, to some extent, the route must be constrained. The standard IntServ approach stores this information in a flow table in each router along the path. However, this method is not suitable for DS/DQM, since for DS/DQM, the only fixed points in the path are the source, destination, and interface routers (and interface routers effectively act as proxy sources and destinations). These are also the only points where the request-grant path and the data path are known to coincide. This implies that flows that are to be delivered to non-participating domains must use loose source routing to direct the packets to the correct interface router on the other end of the participating domain.

Flows which pass through a sequence of participating domains have a reservation along the "domain path," which is the sequence of participating domains through which the data flow passes. In a dynamic network, this domain path may change. For this reason, the refresh mechanism is the same as the original request-grant mechanism. Periodic refreshes then cause reservations to be made along the new domain path. This is the same mechanism used by standard IntServ to handle changes in its detailed paths. Unlike standard IntServ, however, the data packets receive the same forwarding precedence in all domains whether they have a reservation or not, and there is no interruption in the QoS received by a flow when a domain path changes.

2.3 QM Tables

There are six tables of information contained within the QM to facilitate the use of the Request-Grant Protocol. These tables keep track of the submitted requests, the granted reservations, the peripheral domains, domain-wide QMs along with pertinent summary information, the reported congested links, and the links to peripheral domains. Because the Request and Reservation ID numbers are assigned locally by each QM, it is necessary to record these to facilitate communications between domains. In all cases, the predecessor refers to the source or QM that is one domain "closer" to the source, and the successor is the destination or QM one domain "closer" to the destination.

2.3.1 Pending Request Table

This table contains a record of requests that have been sent and have not yet been answered by a grant or denial and have not yet timed out.
  QID—The Request ID generated by this QM
  PQID—The Predecessor QID, the Request ID of the request that was received and caused this request to be generated.
  RID—If refreshing a request, this is the previous Reservation ID, otherwise this is NULL.
  PADDR—The Predecessor address, the IP address of the issuer of PQID.
  QOS—The Requested level of QoS.
  BW—The Requested bandwidth at the above QoS
  TIME—This may or may not be a field, but simply indicates that each entry has an associated timer.

2.3.2 Reservation Table

This table contains a list of all reservations that have been granted by this QM.
  RID—The Reservation ID generated by this QM
  SRID—The Successor RID, the reservation ID of the Grant received that triggered this Grant to be made.
  QID—The Request ID, generated by this QM when the Request for this reservation was received.
  QOS—The Granted level of QoS.
  BW—The Granted bandwidth at the above QoS.
  PADDR—The Predecessor address, the IP address to which this QM issued a Grant.
  SADDR—The Successor address, the IP address from which this QM received a Grant.
  TIME—This may or may not be a field, but simply indicates that each entry has an associated timer.

2.3.3 QM Condition Table

This table contains a list of all QMs in the same domain, with summary information reported by each. This table includes the information for the local QM.
  QM ID—The ID of the QM for this entry
  BW Allocated—The amount of BW this QM has allocated to it. The TDB should equal the sum of the allocations of all QMs in the domain.
  BW Reserved—The amount of BW this QM has granted in reservations.
  Number of peripheral domains—The number of peripheral domains as found in the Peripheral Domain Table, Section 2.3.5.
    Domain ID—The ID of the peripheral domain for this subentry
    The number of links to the peripheral domain
    The total capacity of the links to the peripheral domain
    The amount of reserved bandwidth to the peripheral domain
  The number of congested links reported by this QM.
  TIME—This may or may not be a field, but simply indicates that each entry has an associated timer.

2.3.4 External Link Table

This table contains a list of links to peripheral domains that have been reported to this QM by routers within its domain.
  Domain ID—The ID of the peripheral domain of the node at the other end of the link.
  Link ID—A unique identifier for the link.
  Capacity—The total bandwidth available over this link.
  TIME—This may or may not be a field, but simply indicates that each entry has an associated timer.

2.3.5 Peripheral Domain Table

This table contains a list of all domains other than this QM's domain to which this domain connects. These peripheral domains are either associated with one or more links in this QM's external link table or were received in update messages from other QMs within this domain.

- Domain ID—The domain to which this entry refers.
- Number of connections to domain—The total number of links to this domain in the external link table and in updates from all other QMs in this domain
- BW/QOS—The total bandwidth allocated for each QoS level for each of the connections. The sum of the reported capacities of all the links counted above.
- Reserved BW/QOS—The total amount of bandwidth reserved for each QoS level. This is the sum of what this QM has reserved and what all other QMs in this domain report having reserved to this domain.

2.3.6 Pending QM Grant Table

This table contains the information about the QM-Grants that have been made, including the QM making the QM-Grant and the bandwidth granted. When a QM-Denial or QM-ACK is received, the entry is deleted if received before the timer expires. This table is used in the Inter-QM protocol described in Section 4.

- QM ID—The ID of the QM requesting the bandwidth transfer.
- BW—The amount of bandwidth that was QM-Granted to the QM.
- TIME—This may or may not be a field, but simply indicates that each entry has an associated timer.

2.3.7 Congestion Table

This table contains a list of the links within this QM's domain which have reported congestion

- Link ID—This ID must uniquely identify the link to avoid duplication
- TIME—This may or may not be a field, but simply indicates that each entry has an associated timer

3 Domain Organization and Evolution

To apply the DS/DQM QoS mechanism to a network, that network must be organized into a collection of domains containing one or more routers and connected to one another by external links. In some cases, such as a cluster of terminals connected to a base station and incapable of communicating independently of that base station, this organization is obvious and fixed. In other cases, such as a flat network of nodes that can freely talk amongst themselves, there is no predetermined organization.

This section describes a mechanism by which a flat, completely democratic network can self organize into a collection of linked domains. This mechanism also provides for detection of topological or traffic distribution anomalies and corresponding adjustments to the domain boundaries. The mechanism also provides for continual evolutionary adjustment in a dynamic network.

The mechanism frequently refers to the origin of a domain. This origin is the node that originated the formation of the domain by spontaneously sending organization messages to its neighbors. The origin is also the zero-point for the domain hop counts, which may be considered a coordinate system in the domain. The original origin of a domain is necessarily also a QM, but has no other significance. If the origin of the domain later moves to another network element, it may no longer be a QM.

This domain organization mechanism operates on every router in the network, with input information as the current condition of the router and the current condition of the router on the other end of each link connected to this router. The mechanism runs at start up and in response to certain events, such as a change in the condition of the router or receiving an organization message from a neighbor.

The goal of the algorithm is to organize the network into a set of one or more compact domains, and, if bottlenecks are detected in the topology, to adjust domain boundaries to coincide with these bottlenecks. It is further intended that this domain organization be fluid and continuously adapting to changes in the dynamic network. This is to be done as locally as possible with a minimum of overhead.

3.1 Router Condition Tables

There are two sets of information that all of the network routers must maintain, the network element state table and the link state table. The organization algorithm uses these two pieces of information to continuously update the domain formations.

3.1.1 Network Element Condition Table

This table is maintained in every router, and includes the hop count and ID numbers of the domain and the QM, as well as other domain specific information. The table is shared with the element's immediate neighbors upon any change in condition via the organization message defined in Section 6.2.1. Note that each element can be in one of four domain states, NO_DOMAIN, DOMAIN_ACQUIRED, DOMAIN_REQUIRED, or DOMAIN_EXCLUDED.

- Domain State—This indicates if a domain has been acquired or not, or if the domain indicated is excluded from use.
- Domain Origin (DO) Address—The address of the domain origin.
- Domain ID—The ID of the Domain, which is a composite of the domain origin address and the UNIX time of domain creation.
- Domain Hop Count—The number of hops from the network element to the domain origin.
- QM ID—The ID of the QoS Manager that this network element uses.
- QM Hop Count—The number of hops from this network element to the QoS Manager.

3.1.2 Link Condition Table

This table of information contains the link ID and other information, which is used in the domain organization algorithm. Information regarding congestion on the link is forwarded to the QM as necessary.

- Link ID—The ID of the link, which, when combined with the network element address, creates a unique ID for the link.
- Congestion State—Flag that indicates if the link is congested or not.
- Network Element State—The condition of the network element on the other end of the link, as described in Section 3.1.1.

3.2 Domain Organization

Figure 12:
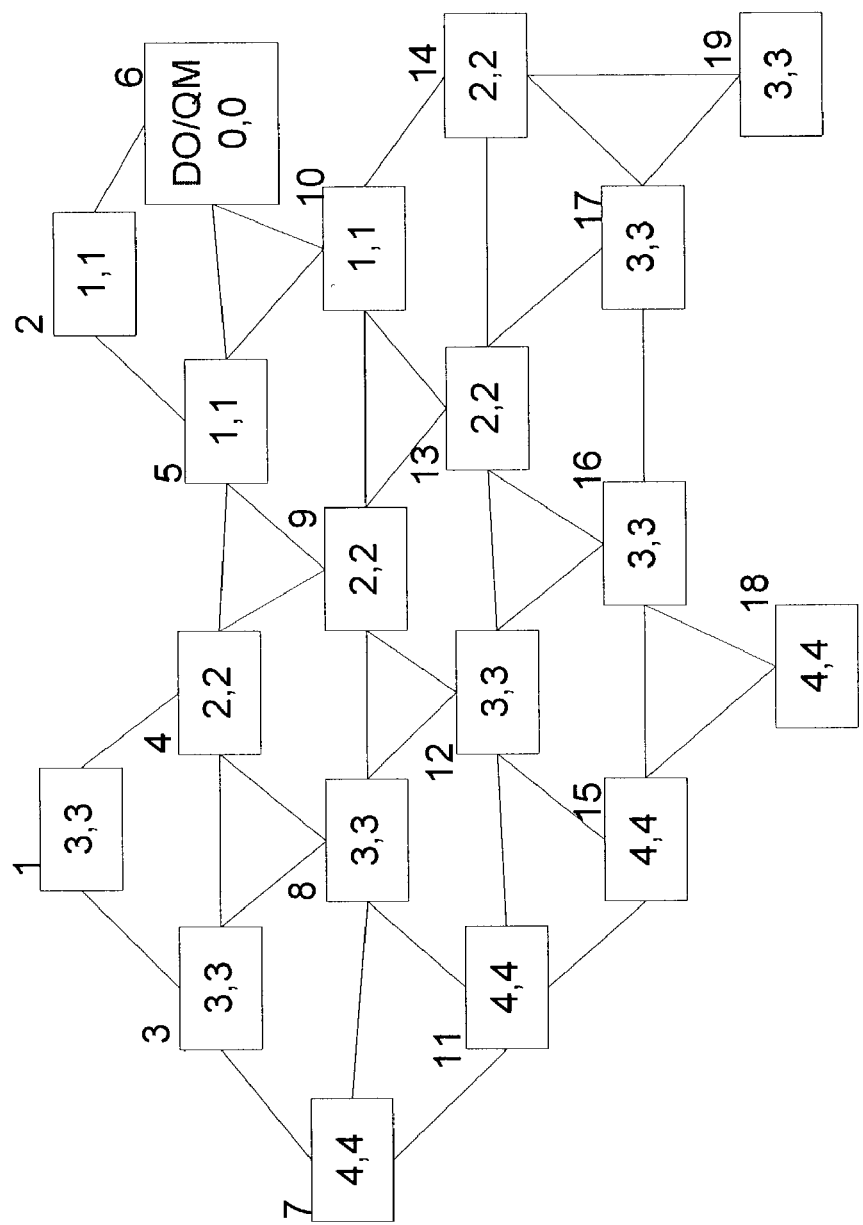
FIG. 12 is a simplified schematic diagram showing a DS/DQM Domain with QM hop count, Domain Hop Count.

When a group of routers is first started up, they will not be organized into domains, and the domain acquired state is NO_DOMAIN. Each router will only know the location and interfaces to use to communicate with its nearest neighbors, which are defined as those network elements a single hop away, and will not know the location of a QoS Manager to use for packet admission control. There is also a timer started in each router, which has length determined by a random seed. If a router does not receive an organizational message, as defined in Section 6.2.1, before the timer ends, the router becomes a domain origin (DO). In FIG. 12, this would be router six, labeled as "DO". The domain origin creates the domain ID, which consists of the DO's IP address and the current UNIX time. The router sets both the domain and QM hop counts to zero, and the domain origin address and QM ID to its own address. It then changes the domain-acquired state to DOMAIN_ACQUIRED, and sends organization messages to each of its neighbors; for router six, this means that messages are sent to routers 2, 5, and 10.

When a router receives an organization message, the router updates the link condition table for that link, and then compares this new information to its own condition. For example, router 10 will first check its domain-acquired state. If it is NO_DOMAIN, and the link is not marked as congested, router 10 will change state to DOMAIN_ACQUIRED, and update its condition table to include the DO address and the domain and QM ID numbers. Router 10 then sets both its hop counts to one greater than those included in the message. Since there has been a change in the element condition, router 10 sends organization messages to each of its neighbors, routers 5, 6, 14, 13, and 9.

If a router receives an organization message, it updates the link condition table, and then examines if further processing is needed. If the router has a domain state of DOMAIN_ACQUIRED, the domain IDs and QM IDs match those in the local condition table, and the QM hop count is below the threshold, no further action is needed. If the domain state is DOMAIN_ACQUIRED and the IDs do not match the local table, or the QM hop count is above the threshold, more processing is required. The router could decide to switch to a different QM, become a new QM, or even change to a new domain. If the domain state is NO_DOMAIN, the router performs the same actions as router 10 did above, accepting all the new information as its own, including sending out messages to its neighbors. For example, router 13 would send organization messages to routers 9, 10, 14, 17, 16, and 12, and router 14 would send messages to routers 10, 13, 17, and 19. Note that the messages are fanning out from the DO, and eventually all the routers will have a QM. This is shown in FIG. 12, with the DO/QM shown in router 6, and all the other routers marked with the appropriate QM and domain hop counts. Note that since there is only a single QM for the domain, the domain and QM hop counts are the same for all the routers.

3.2.1 Multiple QoS Managers

One of the valuable features of the DS/DQM mechanism, when used in a mobile network, is the ability for the QoS Managers to be distributed. Therefore, there must be a way to create QMs in the domain in addition to the DO. As the organization messages are exchanged between routers that are farther and farther away from the DO, the hop counts will become larger. This QM hop count can be used to determine which routers become QMs.

Eventually the QM hop count will pass a set threshold. This threshold is the maximum number of hops that a router can be from its QM. If for any reason a router selects a QM with a QM hop count greater than the threshold value, it will start a timer based on a random seed. If the timer ends before the router selects a QM with an acceptable threshold, the router will become a QM. The router then sets the QM ID to its own IP address and the QM hop count to zero in the element condition table. Organization messages are then sent to all of the router's neighbors, with the updated QM ID and hop count information. This change in QM will propagate back towards the other QM(s) in the domain, until all routers in the domain have selected a QM within the acceptable hop count range.

Figure 13:
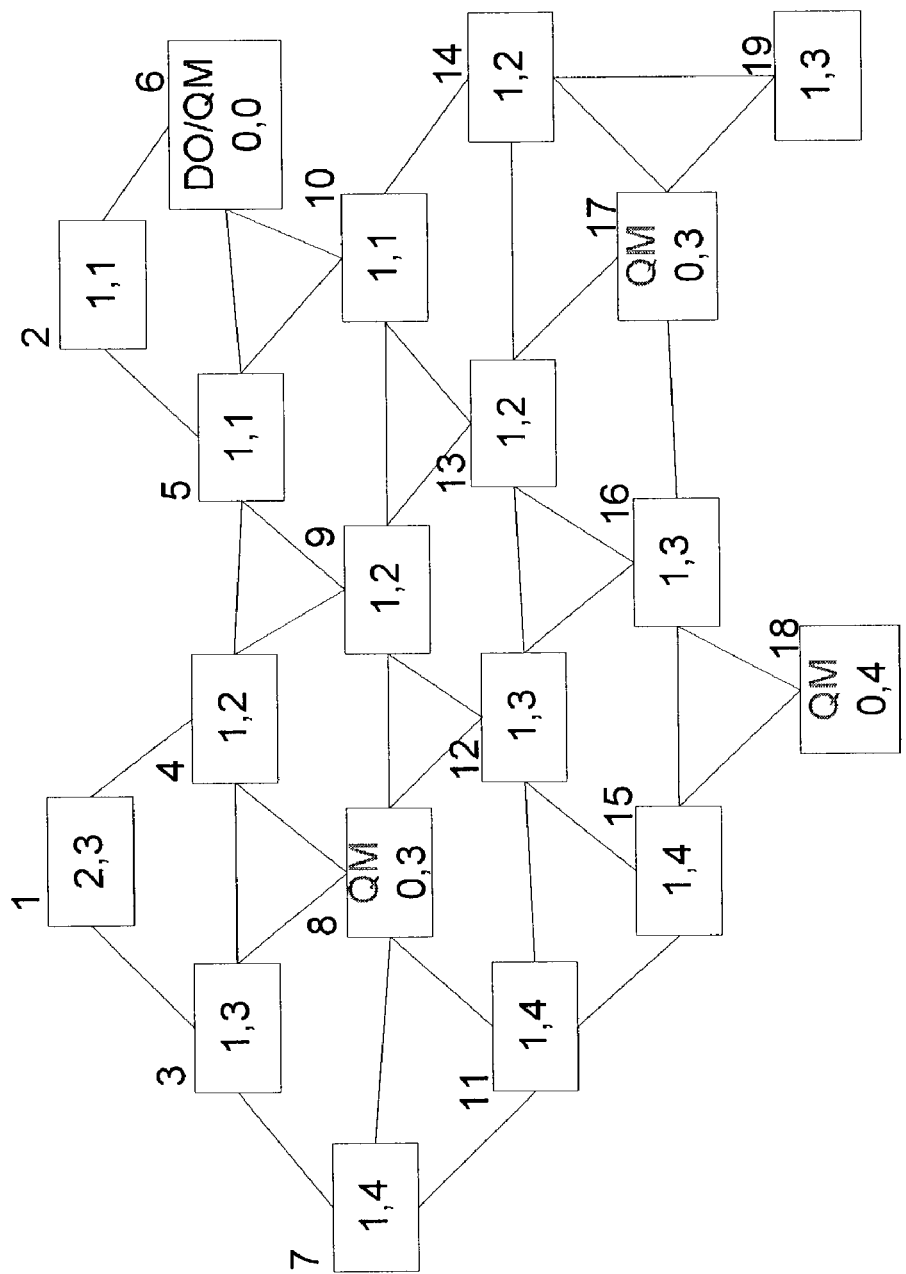
FIG. 13 is a simplified schematic diagram showing a Domain with Multiple QoS Managers with QM hop count, Domain Hop Count.

FIG. 13 shows the example network from above, except with multiple QMs selected. Note that the QM threshold value in this example is a hop count of three, contrasted with the domain hop count that has a value of four in some routers. Increasing the threshold value would cause there to be fewer QMs, and for them to be farther apart. The size of the threshold also determines if there are multiple QMs in small networks, or if the DO will be the only QM.

3.2.2 QM or Domain Change

When a router with domain state DOMAIN_ACQUIRED receives an organization message, it compares the information contained in the message to that in its own condition table. If the two sets of data are different, the router might have reason to change to this other QM or domain. In making this decision, the condition table for each link needs to be examined for more information.

When deciding which QM to record in the condition table, the QM hop counts of the local condition table and those contained in the link condition tables are consulted. The QM with the lowest hop count is selected. If this is the QM already in the condition table, the hop count is checked to ensure that it is one greater than the lowest hop count to that QM. If the selected QM is not the one currently in the condition table, the QM ID is updated, and the hop count is changed to one more than the lowest known hop count to that QM. If there has been a change to the condition table, this router sends organization messages to its nearest neighbors with the new information.

The decision of which domain to select is dependent on the number of links associated with each domain and the domain hop count of each link. The domain that is associated with more links is selected, and the condition table is updated, using the link with the smallest hop counts. If there are two or more domains associated with the same number of links, the domain with the smallest hop count is selected, and then the condition table is updated. If multiple domains are associated with the same number of links and have the same smallest hop count, a domain is arbitrarily selected, possibly by smallest domain ID. When a new domain is selected, the domain ID, domain hop count, QM ID, and QM hop count are updated in the condition table, and then organization messages are sent to each of the router's nearest neighbors. No messages are sent if the condition table has not changed.

Given the way the domain organization works, it is expected that the domain is pulled along with a moving origin, with nodes switching into the domain as its origin approaches and the nodes left behind switching to other domains as the origin recedes. However, it is important to note how the domain origin processes organization messages. Clearly, it has a fixed hop count of 0 and does not recompute its hop count based on its neighbors. The DO does need to pay attention to the domain IDs of its neighbors. If the domain origin determines that a majority of its neighbors have a different domain ID, it should switch to the new domain and then compute its hop count in the new domain, in which it would not be the origin. If the domain origin should lose contact with all of its neighbors for any reason, it ceases to be a domain origin. If it subsequently comes back into contact, it behaves as any other node coming into contact would, and therefore, does not assume it is still a domain origin.

3.2.3 Loss of Domain Origin

The domain organization mechanism is based on hop count distances from a domain origin, which is the node that started the organization process by issuing the organization message to its neighbors. This particular node remains fixed at a hop count of 0. All other nodes set their hop count to the smallest value of any of their neighbors plus 1. The problem is that when the origin, the fixed 0 point, disappears, the mechanism becomes unstable, since all nodes cannot have a hop count 1 greater than the lowest hop count of any of their neighbors if none of the hop counts are fixed.

When a node of hop count 1 loses the link to the origin, it does not automatically recalculate its domain hop count. Instead, it sends a domain origin check message to the saved domain origin address. If the domain origin has simply lost the connection with this node but is still active in the domain, it responds to the origin check message. When the node receives a response to its probe, it then recalculates its domain hop count in the usual way. If the node times out waiting for a response to the probe, it then assumes the domain origin is actually missing. It has either disappeared or moved into another domain. It sets a random timer, which is necessary because all of the old origin's neighbors should discover its absence at about the same time.

When the random timer times out on one of these 1 hop nodes, that node sets its domain hop count to 0, and then issues organization messages to all of its neighbors which contain its own IP address as the domain origin address. When all the outstanding reservations between peripheral domains, etc., which depend upon the domain ID are considered, it seems apparent that the domain ID should not change, but that the original one should be maintained. This is why the domain origin address needs to be saved separately from the domain ID, even if the domain ID is the IP address of the original domain origin. When a node that is waiting on its random timer receives an organization message containing a domain origin address that is different from the saved domain origin address, it cancels the random timer, saves the new domain origin address, and recomputes its domain hop count in the usual way.

The principal problem is what subsequently happens to the old domain origin. If that origin has been destroyed, there is no problem. On the other hand, if it has just moved to another domain or been temporarily out of contact and subsequently returns, there is a potential problem. There are cases where a new domain is formed by means of one node timing out and creating a new domain using its IP address as the domain origin. As long as the domain which has selected a new origin does not change its domain ID, and the old origin is floating around out there somewhere and could possibly become the origin of a new domain, the possibility of having multiple domains with the same domain ID exists. For this reason, a domain ID that is not identical to the IP address of the founding domain origin is used. The IP address was chosen as the easy way to guarantee uniqueness, but additional information needs to be added so that if the same node creates another domain at some later time, it will compute a new and different domain ID. Therefore, the domain ID is composed of the IP address of the domain origin and the UNIX time at creation of the domain.

3.3 Domain Evolution

As changes occur in the mobile network, routers may leave and enter the network at any time, causing the conditions of each router to also change and triggering organization messages to be sent. Changes in the network may also trigger congestion in a specific link, which will cause the domain to split into two pieces along that link. When routers and other network elements move, parts of the network will become closer together, which will trigger a domain merge.

3.3.1 Domain Splitting

A domain split is needed if persistent and heavy congestion exists on a single or few links that a single router reports to its QM, which is detected by long queues and delays at the link layer. The organization message with the DOMAIN_EXCLUDED state is used to initiate a domain split. When an organization message is received with this state indicated, the network element checks the domain ID listed to its own domain ID. If they are the same, and the current domain hop count is greater than that in the message, the element sets its own domain state to DOMAIN_EXCLUDED, and sets a random timer to become a new domain origin. Another organization message is then sent to the neighbors with the DOMAIN_EXCLUDED state set. At this point, the network element is waiting to receive an organization message or to become a domain origin, as discussed in Section 3.2. Note that the excluded domain is not remembered after a new domain is acquired.

3.3.2 Domain Merging

Included in the information shared among the QMs is the list of peripheral domains, and how many links exist from that QM (or routers that reported to it) to each peripheral domain. When the total number of links to the peripheral domain from this domain exceeds a threshold value, organizational messages with the DOMAIN_REQUIRED state and the current domain ID of the chosen domain are sent to the routers in the peripheral domain by the QM of the chosen domain with the most links to that domain. Upon receiving this message, the network element will change its condition information to be the new domain, and then send the organization message with a DOMAIN_REQUIRED state to its neighbors that have the domain ID of its former domain. In this way, the former domain will become part of the selected domain.

4 Inter-QoS Manager Communication Protocol

To function correctly, the QoS Managers need to communicate among themselves at certain times to update the tables described in Section 2.3. The QMs share information about their own condition, as well as sharing what other QMs exist in the domain. A QM sends update messages to all the QMs it has in its QM condition table. These update messages include three different types of information, and are sent when the information changes exceed a certain configurable threshold.

The first type is an actual update of the QM's own condition. It includes the QM ID, the amount of bandwidth allocated to the QM, as well as the amount of bandwidth reserved by this QM, the number of congested links that have been reported to the QM by routers, and a timestamp on this data. The second type includes peripheral domain information. This includes the ID of the peripheral domain, the number of links to the domain that this router is aware of, and the total amount of bandwidth that is available from the domain, as well as reserved from the domain on those links. These first two types of information are sent out in a QM Update message when any of the bandwidth values, either allocated or reserved, change by a threshold amount. This threshold will be measured as a percentage of the previous value sent in the last update message. The last type of update is the QM list message, which includes the list of known QM IDs. This is sent whenever a new QM is added to the list and by a newly created QM.

These three types of update messages are used to discover new QMs in the domain, distribute and change the TDB due to changes in the domain, and maintain control of the domain bandwidth if a QM fails.

4.1 Discovery of New QMs

The domain information is distributed throughout the domain and stored in each of the QMs. This information is updated each time an update message is received from another QM. However, for the QMs to know where to send the updates, each QM must have a list of all of the QMs in the domain. The QM list message is used to facilitate this process, as well as information in the organization message.

The first QM created in the domain is the domain origin. At this point, there is only one QM, and it, therefore, knows about all the QMs in the domain, because it is the only one. As the routers receive organization messages, more QMs will be added to the domain as necessary. A router that becomes a QM knows about at least one other QM in the domain, because there was a QM listed in the organization message that it received, but that QM was too many hops away to select. Therefore, the new QM knows about itself and one other. This new QM will send out a QM list message to all the QMs on its list, informing them of this QM's existence.

When a QM receives a QM list message, the list is checked against the QM IDs contained in the QM's internal table. If the two lists match, no further action is needed. If there are QM(s) in the table that are not on the list, send a QM list message to the message source. If there are QM(s) on the list that are not in the table, add the QM(s) to the table. This change in the table triggers the QM list message to be sent from this QM to the other QMs on the list. Several messages may be received or sent by each QM before the process has ended. After this process is complete, each QM in the domain will have a complete list of the QMs contained in its internal table.

4.2 Distributing TDB Among QMs

In order for the TDB to be a useful concept, it must be allocated appropriately among the QMs in the domain, so that each QM can reserve bandwidth as requested. To facilitate the TDB distribution, another set of messages is needed, namely a QM Request, a QM Grant, a QM Denial, and a QM ACK. Using these messages, the QMs are able to make bandwidth available to the areas of the domain that need it.

When QMs are created, including the domain origin, they assume an initial bandwidth allocation of the bandwidth of the smallest link they are connected to. If more bandwidth is needed than what the QM currently is allocated, it must be granted a bandwidth allocation from another QM. These granted allocations are permanent; that is, the granting QM decrements its allocation by the granted amount, and the receiving QM's allocation is incremented. This also enforces the fact that a QM may not use the bandwidth of another QM until it has been granted.

Figure 14:
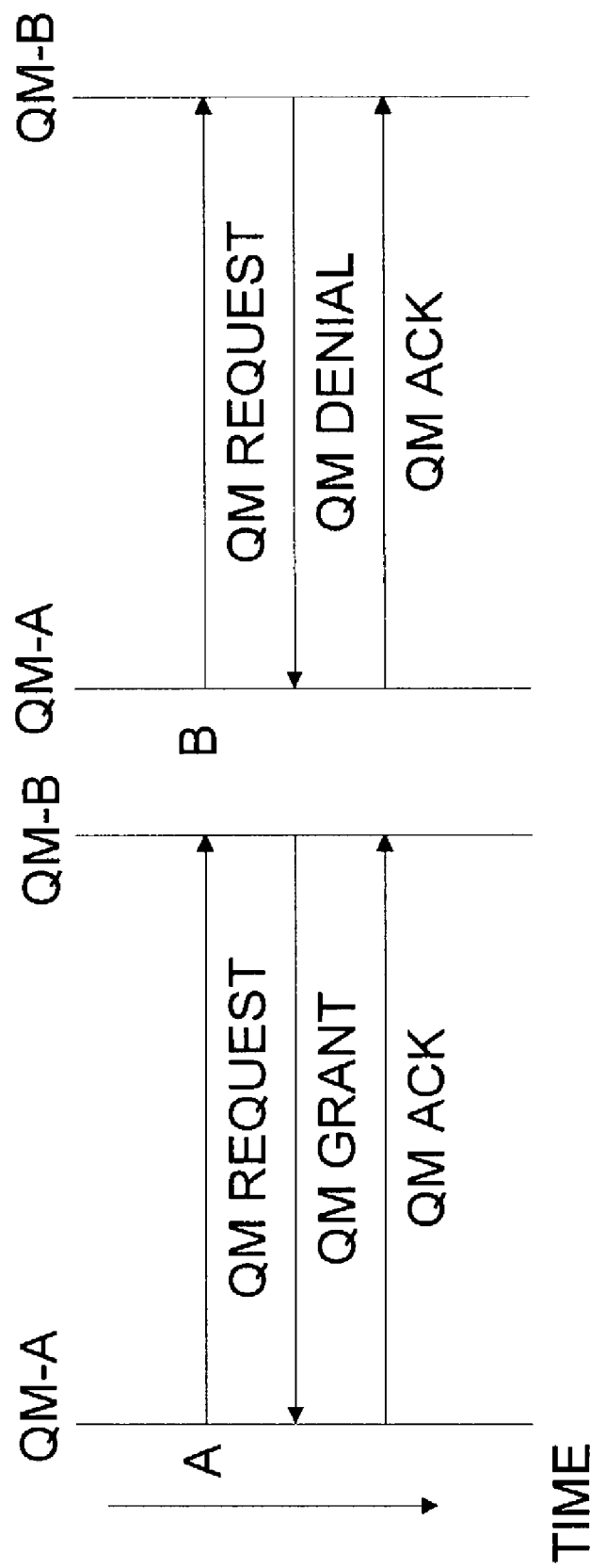
FIG. 14 is a time-based flow diagram of a QM Request Sequence.

When a QM (QM-A) needs more bandwidth than it is currently allocated, it may request allocation from another QM (QM-B), and QM-B either grants or denies the request. QM-A then responds to this with a QM ACK, completing the three-way handshake, as shown in the two message sequences in FIG. 14. QM-B decrements its allocation when the QM Grant is sent, and QM-A increments its allocation upon receiving the QM Grant. If QM-B does not receive a QM ACK, it increments its allocation back up to what it was before the QM Grant.

Each QM should attempt to maintain an allocation above the amount of reservations, so that Requests will not be unnecessarily denied. For this reason, if the unreserved bandwidth becomes less than 10% of the amount of reserved bandwidth, the QM will QM Request enough bandwidth so that the amount of unreserved bandwidth will exceed this level. However, the Requests must be made of QMs that have at least 20% more allocated bandwidth than reserved. If there are no QMs in the domain that have this amount of unreserved bandwidth, the QM is not able to request more.

4.3 Changing the TDB

The TDB must be able to react to changes in the network that affect the load the domain can handle. Each QM is responsible for appropriately reacting to congestion by changing the amount of its allocated bandwidth, which is facilitated by periodically checking the internal QM congestion table. The allocation for each QM is incremented and decremented as needed, and the TDB is then calculated as the sum of the allocations.

4.3.1 Incrementing

If no congestion is found in the QM's internal congestion table, the sum of reservations is compared to the allocation amount. If the sum of reservations is less than the allocation, no action is taken. If the sum of reservations is greater than or equal, within 10%, to the allocations, the QM increases its own allocation by a small fixed amount, which will be called x. This method allows the TDB to automatically increase as load is increased in a non-congested domain, until congestion is detected.

It may be possible that the allocation will be incremented after several consecutive checks of the congestion table. If this occurs, the fourth increment will be by 2x. Another increment after this would again be only x bandwidth.

4.3.2 Decrementing

If congestion is found to exist and is noted in the internal congestion table, the sum of reservations is compared to the amount of allocation. If the sum of reservations is greater than the allocation amount, no action is taken. If the sum of reservations is less than or equal to the allocation amount, the allocation is decremented.

The amount that the allocation is decremented depends on previous congestion responses by this QM. If the previous check of the congestion table resulted in an increment or no action, the allocation is decremented by x. If this is the second consecutive decrement, the allocation is decremented by 2x, and the third consecutive decrement is by 4x. If the next congestion check still shows congestion, a QM Congestion message, as defined in Section 6.3.3, is sent to the other QMs in the domain. This will result in the other QMs decrementing their allocation by x.

When the amount of allocation is less than the sum of reservations, no more requests are granted. If the allocation is decremented two or more consecutive times, Denials may be sent to the hosts to terminate currently active reservations.

4.4 Recovery after Failure of a QM

This mechanism is designed to perform well in a dynamic and mobile network. Therefore, it is expected that routers, including QMs, will be entering and leaving the network at any time. This means that there must be a way for the domain to efficiently recover after a QM fails or otherwise leaves the domain. There are three steps to this recovery. First, at least some part of the domain must recognize the fact that a QM has failed. Next, the remaining QMs must coordinate to ensure that only one QM attempts recovery. Finally, the selected QM performs the actual recovery.

4.4.1 Detecting a Failed QM

There are two possible ways that the elements in the domain would discover that a QM has failed. The first is that the QM simply does not respond to an inter-QM protocol message. The second is that a host sends a QM a release for a reservation that it did not grant, as in FIG. 6, which implies that the QM that did grant the reservation has failed.

Once a failed QM has been identified by another QM, it is possible to verify the failure by sending a ping-type message to the failed QM, which would be similar in format to the domain origin check message described in Section 6.2.4.

4.4.2 Coordinating for Recovery

When a QM is declared failed, it is necessary that only one other QM is responsible for recovery from the loss. If multiple QMs attempted to recover the TDB from the failed QM at the same time, the TDB would increase incorrectly, which could cause unnecessary faulty performance as more traffic is admitted to the domain than the domain can appropriately handle.

The QM that discovers the failed QM sends a Failed QM message to the domain origin. The domain origin responds to the first Failed QM message that it receives with a Failed ACK message, indicating that this QM will recover the portion of the TDB allocated to the failed QM. After the QM receives the ACK message, it sends the Failed QM message to all the QMs in the domain. When a QM (including the domain origin) receives a Failed QM message, it will respond by appropriately deleting the failed QM's entry from its tables. If a QM receives this message and it refers to a QM that does not exist in its table, the message will be ignored.

4.4.3 Recovering

When a QM receives the Failed ACK message from the DO, it knows that it has gained control of the failed QM. At this point it sets a timer to the time for which reservations are granted, since this is the longest possible time for any outstanding reservation to exist. When the timer expires, the allocation of the failed QM is added to the allocation of the controlling QM.

5 Routing Considerations

Each router must inspect the destination address of each IP packet it receives, select a next hop from among its connections, and forward the packet to that next hop according to a PHB specified by the packet's DS codepoint. This will be done based on a routing table, which is outside the scope of this paper, provided by an external mechanism, such as that developed the MOSAIC IP Mobility program, and a set of rules for selecting one next hop when multiple possibilities are present in the table. The routing mechanism is required to distribute the load that it receives as evenly as possible over the set of paths that include the next hops available for each destination. It must also trap certain messages from external links and redirect them to the router's QM rather than the destination. The following sections describe the expectations of the routing table and mechanism, and a proposed set of PHBs.

Note that both the routing table information and the set of PHBs presented in this section is the most accurate available to date, but is subject to future change.

5.1 Routing Table

Routing decisions are based on information that will be provided by the network routing discovery mechanism, which is outside the scope of this paper. This information is to be provided in the form of a routing table. This routing table consists of entries indexed by destination address, and includes a set of metrics with which to select a next hop for each packet. A proposed set of metrics is shown in Table 2, with descriptions of each, along with other relevant table entries. This set of metrics is merely included as a possible solution. The actual routing table to be used is dependent upon the final decision of the IP Mobility project, and is not available at this time.

TABLE 2

Proposed Routing Table

| Field | Description |
| --- | --- |
| DEST | The address of the destination of the route. |
| M_HOP | Metric indicating the number of hops taken by the route to the destination. |
| M_BW | Metric indicating max possible bandwidth of the route (computed as the min of all the bandwidths of all the links along the route) |
| M_LAT | Metric indicating min possible latency of the route (computed as the max of all the latencies of all the links along the route) |
| M_REL | Metric indicating reliability of the route (composite of the route) |
| M_COST | Metric indicating network cost of the route (perceived cost as indicated by the type of links taken by the route) |
| AGE | Time (in seconds) since this route was updated |

The five proposed metrics listed, hop count, bandwidth, latency, reliability, and cost, will be used in computing which next hop to select. The age of the data for that route might also be considered. The details of how these metrics are defined and how they are compounded, as well as exactly how they are used, cannot be made specific until the route discovery mechanism is defined. The QoS mechanism must be able to be easily adjusted to work with whatever routing table is actually provided.

5.2 Routing Engine

The routing mechanism must process all received packets, as well as all packets originating within the router and addressed to another network destination. In processing these packets, the router performs several functions in determining what the correct action is to take.

If the packet is a request message from an external link, marked with the Alert Option field, the packet must be readdressed to this router's QM, and then forwarded as any other packet. If the destination address matches this router's IP address, the packet is extracted from the input packet stream, and sent to the router's IP stack.

For all other packets, the routing table must be searched for all entries that match the destination address of the packet. If there are one or more entries with suitable QoS metrics for the packet, those that do not have suitable metrics are ignored. When there are no entries with suitable QoS metrics, the packet is forwarded, using the best available service. Select the next hop table entry according to the weighting policy assigned for the QoS marked in the packet, using the available QoS metrics in the table. If there are multiple next hops with similar metrics, make an arbitrary selection. When exactly one possible next hop has been identified using these selection criteria, determine the appropriate interface for the selected route, and queue the packet for transmission on that interface according to its QoS marking.

In queuing the packet to the next hop interface, it is expected that the interface will provide multiple queues and a queue must be selected according to the DS codepoint. Note that packets directed to a non-participating domain are not routed in this way and must have been processed at some level in the stack of the router and passed back down directly to the interface to that non-participating domain. Whenever the interface is ready to transmit a packet, it will select the next packet to send based on the PHB rules, as described in Section 5.3. These rules will also govern how exceptional conditions are handled, e.g. packet discard when the appropriate queue for the target interface is full. Depending upon the DS codepoint of the packet, this condition may also be the cause of sending a congestion report to the router's QM.

5.3 Per Hop Behaviors

Each router must provide a set of PHBs by which packets are queued for forwarding. Per hop behaviors are the set of queuing and scheduling policies applied to the traffic on each outgoing link of each router in the network; the available PHBs are expected to be the same throughout a participating domain. Each packet is marked with one of these categories of service by the originator in accordance with the traffic admission mechanism.

There is a logical difference between the set of PHBs available at each router and the overall levels of QoS provided by the mechanism. In practice, little distinction is made, as all packets of a certain QoS level are marked with the same PHB selector (DiffServ codepoint) and conversely, all packets with the same PHB selector receive the same QoS. It should be clear from context whether a reference is to PHBs or levels of QoS.

A queue, a priority, an allocation, and a discard policy are defined for each PHB. Without going into implementation details, a minimum of four PHBs is expected. Elaboration into further levels of service is possible. The packets are selected from the queues for transmission, using weighted fair queuing, where the queue weights and link bandwidth allocations are configurable parameters per output link. All routers in a participating domain must offer the same set of PHBs on each output link, but these configurable parameters are not required to have the same value for all routers. Note that the DS/DQM mechanism is not dependent on any set of PHBs. The set described here is a proposed set, and is only accurate as of the date of this paper.

TABLE 3

Service Level and Codepoint Fields

| Service Level | Codepoint *msb | Scheduled Priority | Typical Applications |
| --- | --- | --- | --- |
| Flash | *111/xxx | High, Absolute | Critical Situational Awareness (e.g. gas alert, bailout) |
| Expedited | *101/110 | High, Absolute | High-priority voice |
| Assured 2-Preferred | *010/001 | High, Weighted | Low-latency Command and Control |
| Assured 2 | *010/000 | High, Weighted | Low-latency Situational Awareness |
| Assured 1-Preferred | *001/001 | Medium, Weighted | Voice |
| Assured 1 | *001/000 | Medium, Weighted | Low-latency video |
| Best Effort-Preferred | *000/001 | Low, Weighted | Command and Control, Situational Awareness |
| Best Effort | *000/000 | Low, Weighted | Video, file transfers, email, |

TABLE 3-continued

Service Level and Codepoint Fields

| Service Level | Codepoint *msb | Scheduled Priority | Typical Applications |
| --- | --- | --- | --- |
| Flash | *111/xxx | High, Absolute | Critical Situational Awareness (e.g. gas alert, bailout) etc. |

A hierarchical queue structure is used to implement the desired behavior. Five queues are established: Flash, Expedited, Assured 2, Assured 1, and Best Effort, as described in Table 3. These queues are specified with the three most significant bits of the codepoint, called the Class Selector. The Assured 1-Preferred, Assured 2-Preferred and Best Effort-Preferred levels are handled within the Assured 2, Assured 1 and Best Effort queues, respectively. The "-Preferred" marking indicates a preference for non-discarding should congestion occur.

Packets are taken from the Flash queue first on an absolute priority basis. If the Flash queue is empty, packets are taken from the Expedited queue on an absolute priority basis. If both the Flash and Expedited queues are empty, packets are taken on a Weighted Fair Queuing (WFQ) basis from the three remaining levels. It is intended that the various percentage levels for the WFQ algorithm be administratively controllable at runtime.

The absolute priority of the Flash category means that when using Flash service, there is no weighting or fairness algorithm with regard to lower priority traffic; Flash traffic can completely shut out other traffic. Packets in this queue may never be discarded; packets with lower priority will be discarded to make room if necessary. Traffic volume in this category is not limited, but is expected to be very low, with a frequency of less than $10^{-4}$ packets per second and a packet size limited to 100 bytes per packet. Significant traffic levels in this category would seriously impair all other traffic. The Flash service is provided for critical low volume traffic, e.g. threat warning or fire control. Single packet messages are envisioned, possibly predefined with bit field data, so that multiple packets arriving at the same time can be merged by a user provided application function in each router rather than queued. Such packets may be sent without admission control. The intent is to provide extremely fast service for highly critical discrete data. Obviously these are largely application issues, and providing this level of service is dangerous in terms of potential for misuse and resulting poor overall performance.

The Expedited queue provides an absolute priority over the lower classes of service. Therefore, this queue is emptied of packets before any lower queues are processed, and should only be used when the highest priority is needed. Packets in this queue are discarded last, but the traffic volume of this category will be as allocated by the RGP.

The remaining service categories, Assured 2, Assured 1, and Best Effort, are for regular traffic flows of arbitrary size and duration. These flows are divided into high, medium, and low priorities. The priorities are weighted to assure that high priority traffic cannot starve out all lower priority traffic. Their discard policies are in inverse proportion to their priority; i.e. low priority packets are discarded first when queue space is exhausted. These priorities are subdivided into two classes of service distinguished by preferred status. A packet with preferred status has the same priority as one without preferred status, but with minimized discard.

This service is for packets that are not time critical but need reliable delivery. It is also limited to an allocated share of the link bandwidth.

Traffic volume for Assured 2 and Assured 1 is limited to a specified proportion of the link bandwidth. It is an open question whether to enforce this allocation limit at each link or accept the limitation as imposed by admission control and allow the usage on individual links to fluctuate. In the latter case, higher priority packets are allowed to "hog" the link at times to partially compensate for the approximate nature of admission control, at the expense of lower priority traffic. Note that it is implicit in this case that the queue weight would be higher than the link allocation.

Best Effort service is first in line to be discarded and absorbs all unused bandwidth on the link. It corresponds to conventional best effort service and is not limited. Note that there is a preferred status available in the Best Effort category, which is limited to an allocated share of the bandwidth as in the higher priorities.

6 DS/DQM Protocol Packet Formats

Figure 15:
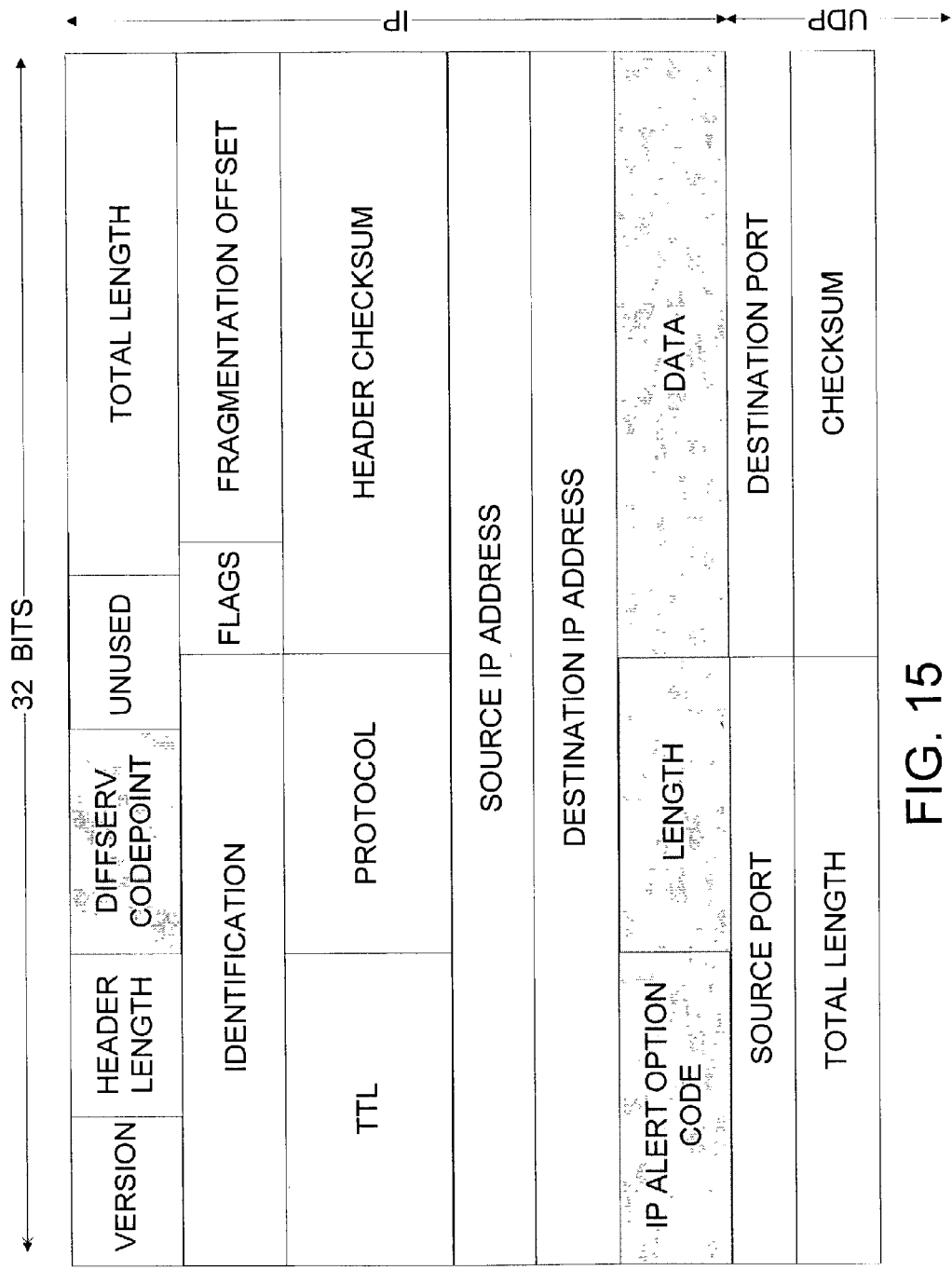
FIG. 15 is a diagram showing a UDP/IP Header.

All DS/DQM messages will be User Datagram Protocol (UDP) messages. UDP sits on top of IP. The diagram in FIG. 15 represents the basic UDP/IP header that will be used to support all QM messages.

There are two areas in this packet format that are slightly different than normal, but within the UDP/IP Specification. These areas are shaded in gray. The first area is the DiffServ Code Point. This 6-bit field is where the packet priority is stored. This is different from the Type of Service fields that are normally in this location. The second is the IP Alert Code in the options field. This alert will only be used in the Request message. This is because the request message needs to be routed to the QM as it moves toward the destination. This option will allow the routers to quickly identify a request message and forward it to the QM as necessary.

There are several messages that are used in the protocol, including the five RGP messages, as well as a congestion report message, an end-to-end feedback message, an organization message, and a QM update message. A message type field identifies the different messages and is defined by an 8-bit field located at the beginning of the body of the message. The Message Type Byte is defined in Table 4. All message bodies reside on top of the UDP/IP packet header show in FIG. 15.

TABLE 4

Message Type

| Message | Message Type Byte |
|---|---|
| Request | 00000001 |
| Trial-Request | 00000010 |
| Grant | 00000011 |
| Denial | 00000100 |
| Trial-Denial | 00000101 |
| Release | 00000110 |
| Release ACK | 00000111 |
| RGP Time-Out | 00001000 |
| Organization | 00001001 |
| Congestion Report | 00001010 |
| Congestion Clear | 00001011 |
| ELR | 00001100 |
| Domain Origin Check | 00001101 |
| QM Update Message | 00001110 |
| QM Update ACK | 00001111 |
| QM Congestion | 00010000 |

TABLE 4-continued

Message Type

| Message | Message Type Byte |
|---|---|
| Peripheral Domains | 00010001 |
| QM List | 00010010 |
| Failed QM | 00010011 |
| Failed ACK | 00010100 |
| QM Check | 00010101 |
| QM Request | 00010110 |
| QM Grant | 00010111 |
| QM Denial | 00011000 |
| QM ACK | 00011001 |

In the following message formats, the bandwidth and QoS fields all have consistent units. Bandwidth is measured in kilobits per second, allowing a range from 1 kb/s to 64 Mb/s. The QoS field consists of the codepoint byte to be used, as described in Section 5.3.

6.1 RGP Packet Formats

This section defines the protocol formats for the five messages that are used as shown in Section 2.1, including the Request, Trial-Request, Grant, Denial, Trial-Denial, Release, Release Acknowledgement, and RGP Time-Out.

6.1.1 Request

Figure 16:
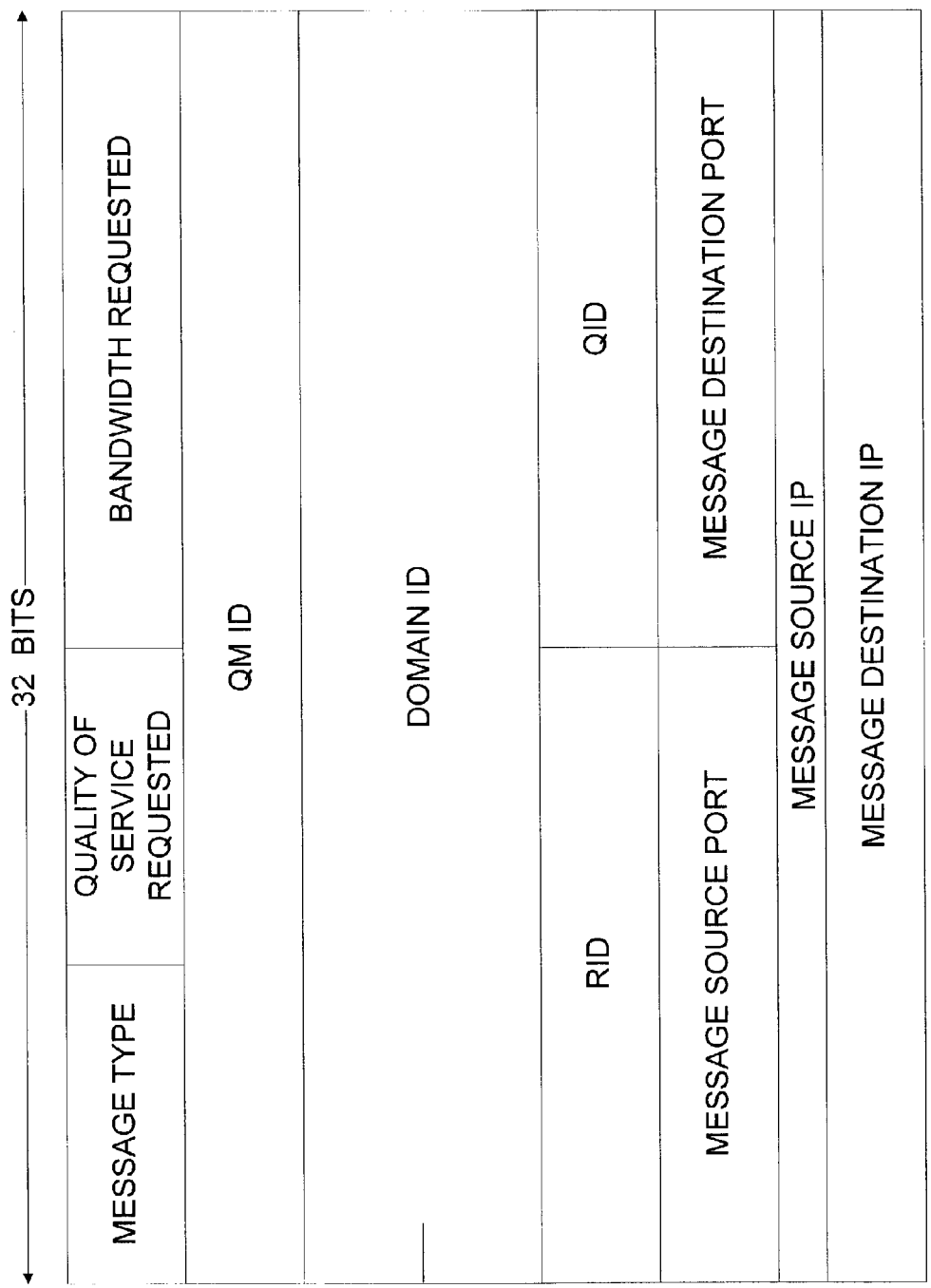
FIG. 16 is a diagram showing a Request Message.

The message packet format is as shown in FIG. 16, with the fields as defined below. The Request is sent to the destination, although often rerouted to a QM, except that the Request sent by the source is sent directly to its QM.

| Message Type | This is the message type as defined in Table 4. |
|---|---|
| Quality of Service Requested | The QMs use the Quality of Service Requested field when admitting the packets to the domain. The selected value will be mapped into the DiffServ Code Point in the IP header. |
| Bandwidth Requested | This field contains the amount of bandwidth that the application would like to reserve. |
| QM ID | The ID of the QM that generated the Reservation if this is a refresh. This value is NULL if it is a new Request. |
| Domain ID | The ID of the domain that originated this Request message. |
| RID | The Reservation ID generated by this QM if this is a refresh. This value is NULL if it is in a new Request. |
| QID | The Request Identification number generated by the sender of the Request. |
| Message Source Port | This field contains the port address of the host application that originated the request. |
| Message Destination Port | This field contains the port address of the destination application for which this flow is destined. |
| Message Source IP | This field contains the IP address of the host that originated the request. |
| Message Destination IP | This field contains the IP address of the original destination. |

6.1.2 Trial-Request

Figure 17:
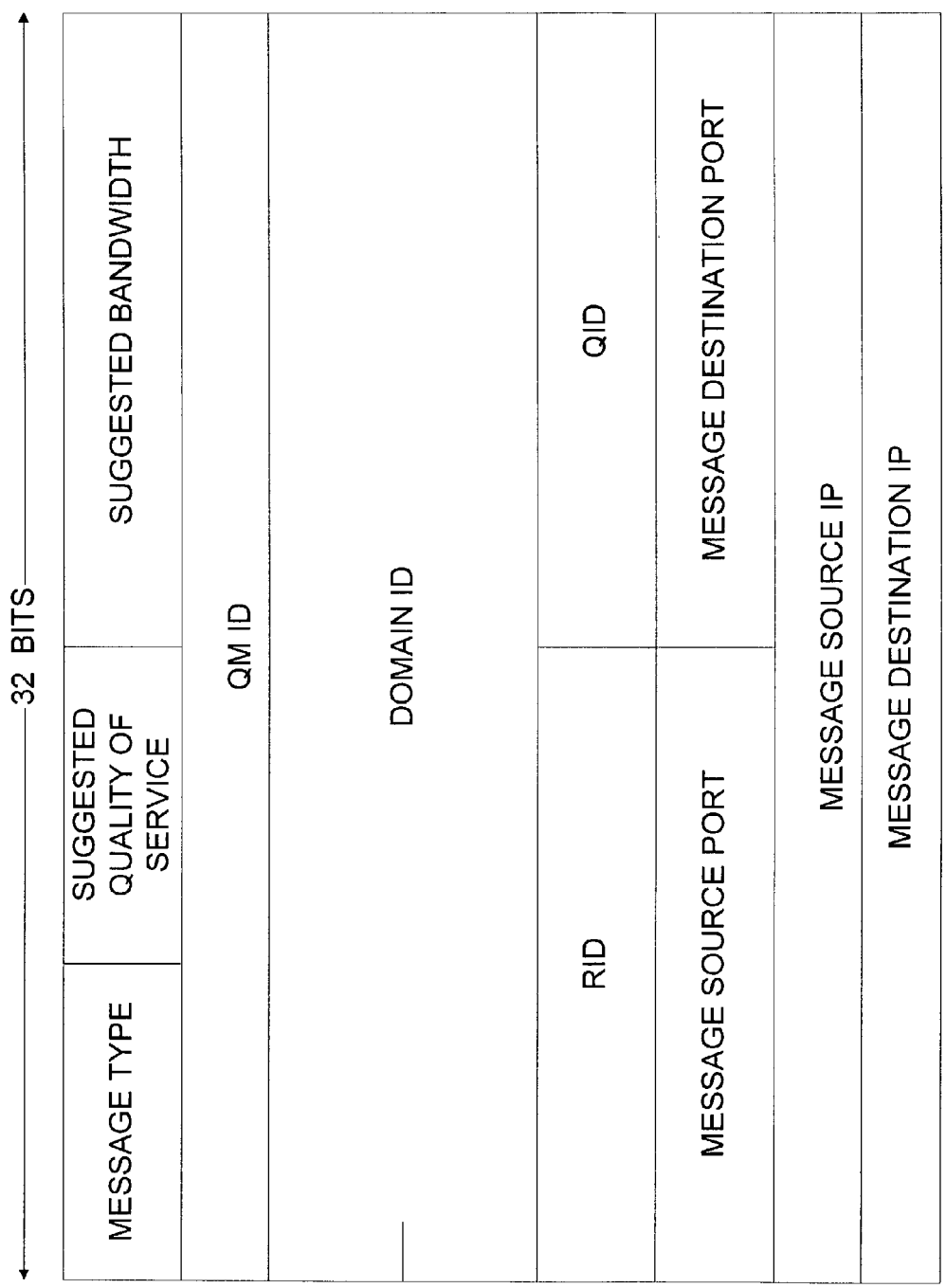
FIG. 17 is a diagram showing a Trial-Request Message.

This message packet format is as shown in FIG. 17, with the fields as defined below. The Trial-Request message is sent to the destination, although often rerouted to a QM.

| Message Type | This is the message type as defined in Table 4. |
|---|---|
| Suggested Quality of Service | This field contains the suggested QoS level at which the QM can Grant this Request. |

-continued

| | |
|---|---|
| Suggested Bandwidth | This field contains the maximum amount of bandwidth that the QM can reserve for this Request. |
| QM ID | The ID of the QM that generated the Reservation if this is a refresh. This value is NULL if it is a new Request. |
| Domain ID | The ID of the domain that originated this Request message. |
| RID | The Reservation ID generated by this QM if this is a refresh. This value is NULL if it is in a new Request. |
| QID | The Request Identification number generated by the sender of the Request. |
| Message Source Port | This field contains the port address of the host application that originated the request. |
| Message Destination Port | This field contains the port address of the destination application for which this flow is destined. |
| Message Source IP | This field contains the IP address of the host that originated the request. |
| Message Destination IP | This field contains the IP address of the original destination. |

6.1.3 Grant

Figure 18:
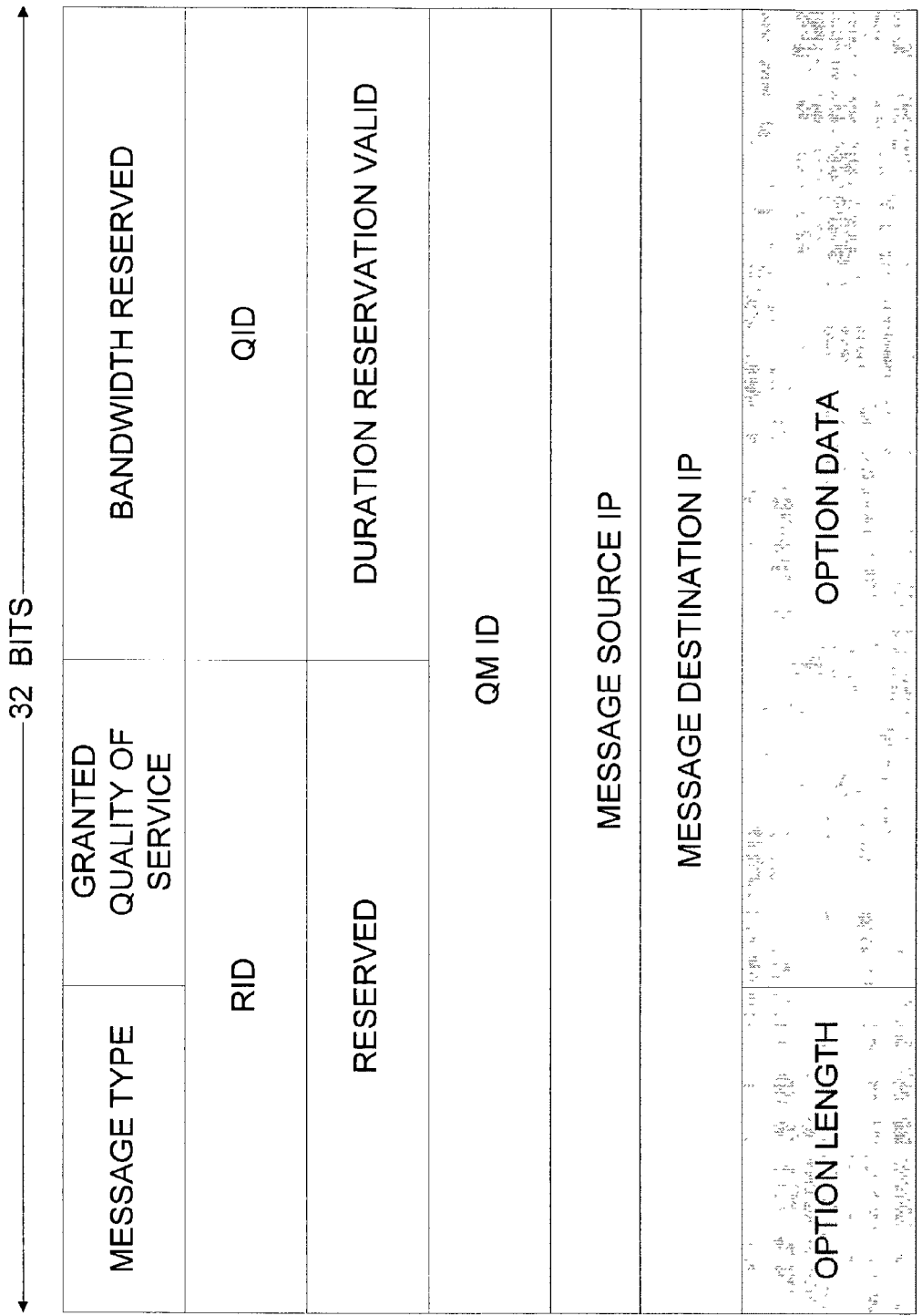
FIG. 18 is a diagram showing a Grant Message.

The message packet format is as shown in FIG. 18, with the fields as defined below. The Grant message is sent to the predecessor QM or the source in response to a Request. The Option Length and Data fields are optional; they will only be present if options need to be included in the IP header.

| | |
|---|---|
| Message Type | This is the message type as defined in Table 4. |
| Granted Quality of Service | This field contains the quality of service that has been granted by the QM. This will be the same as the request. The field is simply used for confirmation. |
| Bandwidth Reserved | This field contains the amount of bandwidth that was granted. This, like the Granted QoS, should be the same as the request. |
| RID | The Reservation ID generated by this QM. |
| QID | The Request ID from PQID in pending request table of Grant generator. |
| Duration Reservation Valid | This field contains the amount of time for which the grant is valid. |
| QM ID | The ID of the QM that generated the Grant. |
| Message Source IP | This field contains the IP address of the host that originated the request. |
| Message Destination IP | This field contains the IP address of the original destination. |
| Option Length | This field contains the length of the Option Data field. |
| Option Data | This field contains any option information that needs to be included in the IP header of the data packets. This field will be pre-formatted into the proper format, and merely be copied onto the end of the IP header. This field can be up to 40 bytes long. |

6.1.4 Denial

Figure 19:
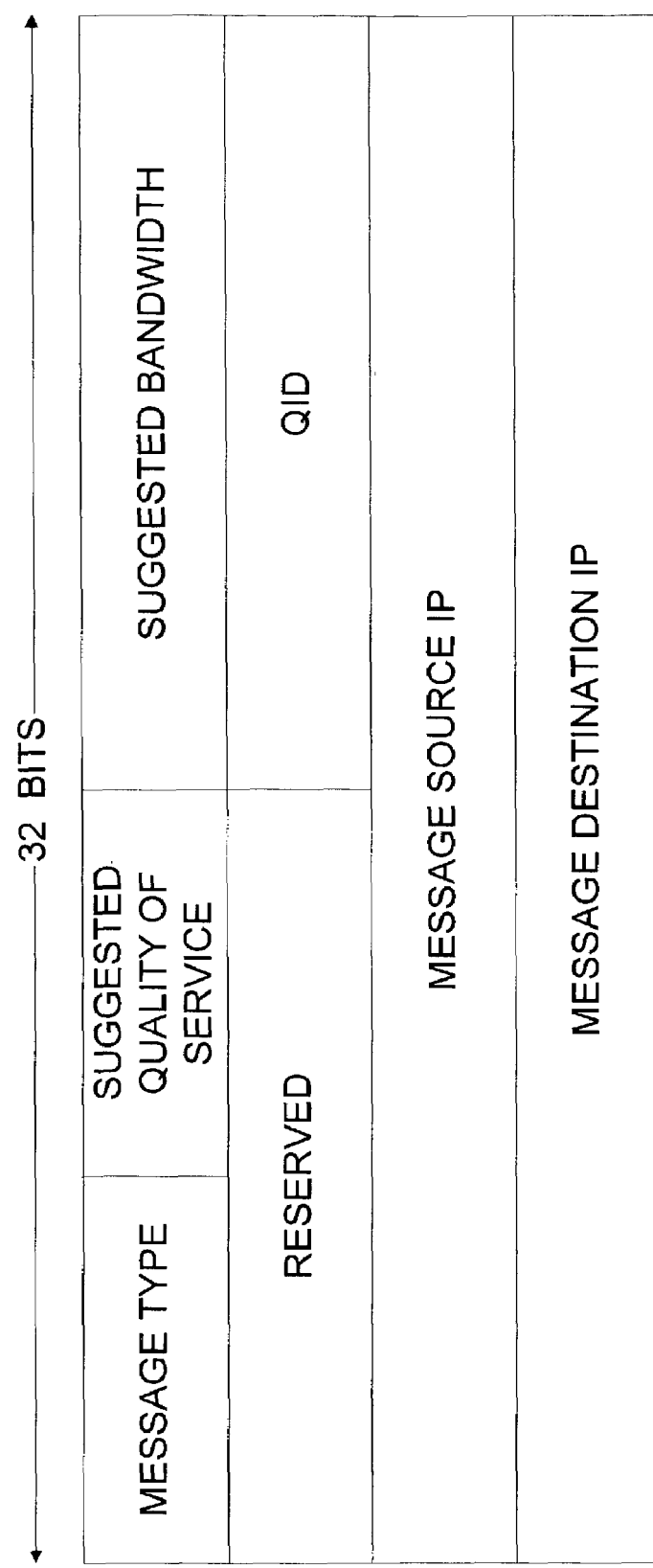
FIG. 19 is a diagram showing a Denial Message.

The message packet format is as shown in FIG. 19, with the fields as defined below. The Denial message is sent to the predecessor QM or the source in response to a Request.

| | |
|---|---|
| Message Type | This is the message type as defined in Table 4. |
| Suggested Quality of Service | This field contains a recommendation of what quality of service the application should ask for. |
| Suggested Bandwidth | This field contains a recommendation of what amount of bandwidth the application should ask for. |
| QID | The Request ID number of the Request being answered. This is found in the pending request table of the QM generating this message. |
| Message Source IP | This field contains the IP address of the host that originated the request. |
| Message Destination IP | This field contains the IP address of the original destination. |

6.1.5 Trial-Denial

Figure 20:
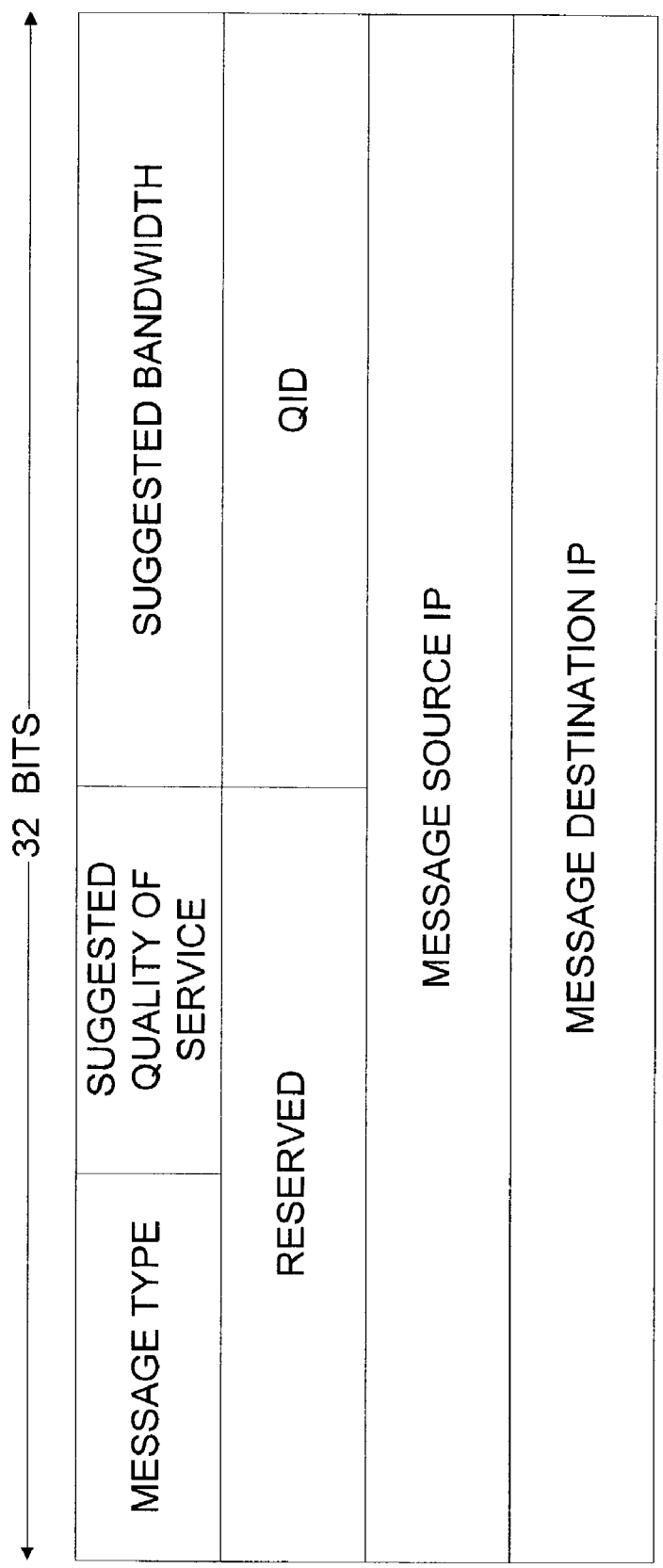
FIG. 20 is a diagram showing a Trial-Denial Message.

The message packet format is as shown in FIG. 20 with the fields as defined below. The Trial-Denial message is sent to the predecessor QM or the source in response to a Trial-Request or Request.

| | |
|---|---|
| Message Type | This is the message type as defined in Table 4. |
| Suggested Quality of Service | This field contains a recommendation of what quality of service the application should ask for. |
| Suggested Bandwidth | This field contains a recommendation of what amount of bandwidth the application should ask for. |
| QID | The Request ID number of the Request being answered. This is found in the pending request table of the QM generating this message. |
| Message Source IP | This field contains the IP address of the host that originated the request. |
| Message Destination IP | This field contains the IP address of the original destination. |

6.1.6 Release

Figure 21:
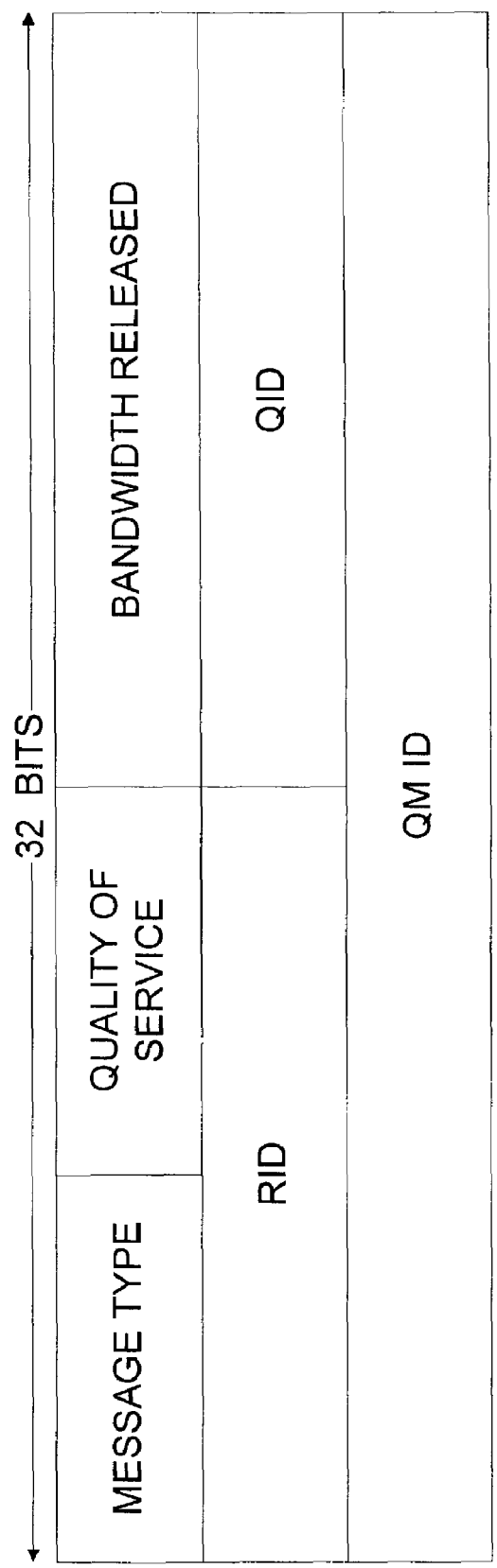
FIG. 21 is a diagram showing a Release Message.
Figure 22:
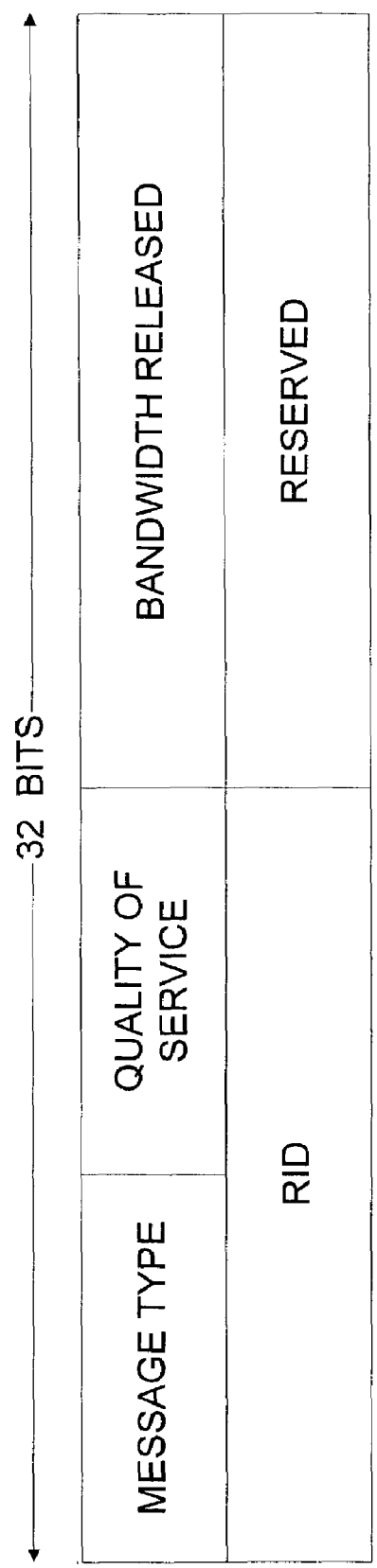
FIG. 22 is a diagram showing a Release Acknowledgment Message.
Figure 23:
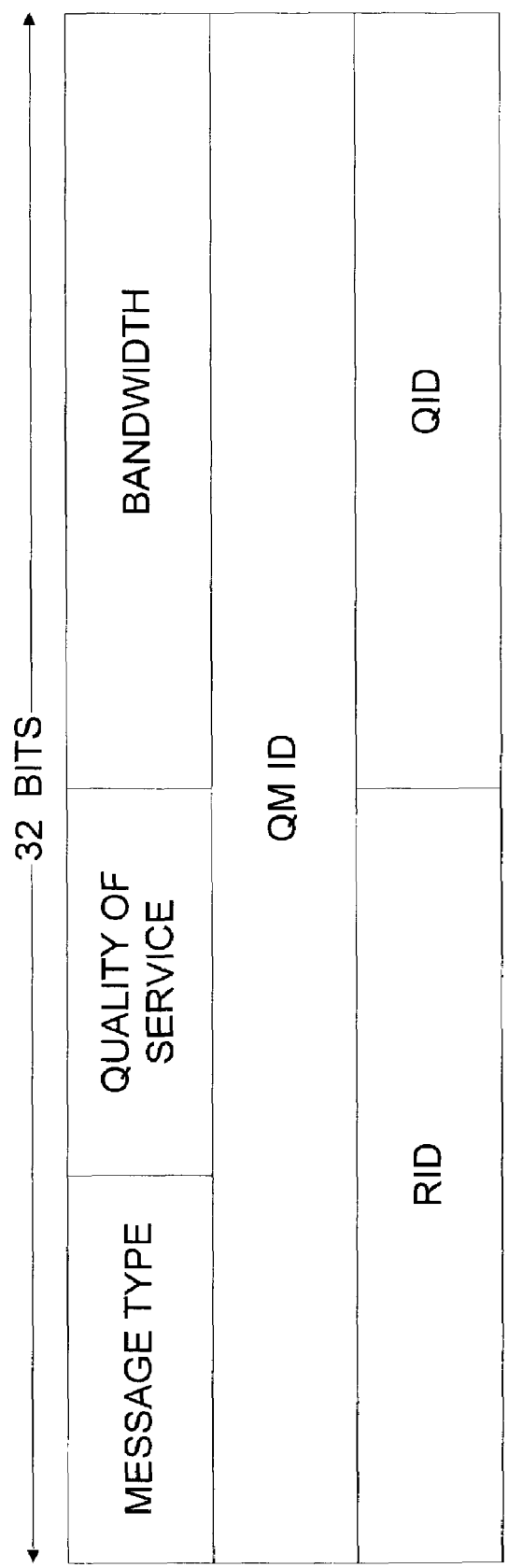
FIG. 23 is a diagram showing a RGP Time-Out Message.
Figure 24:
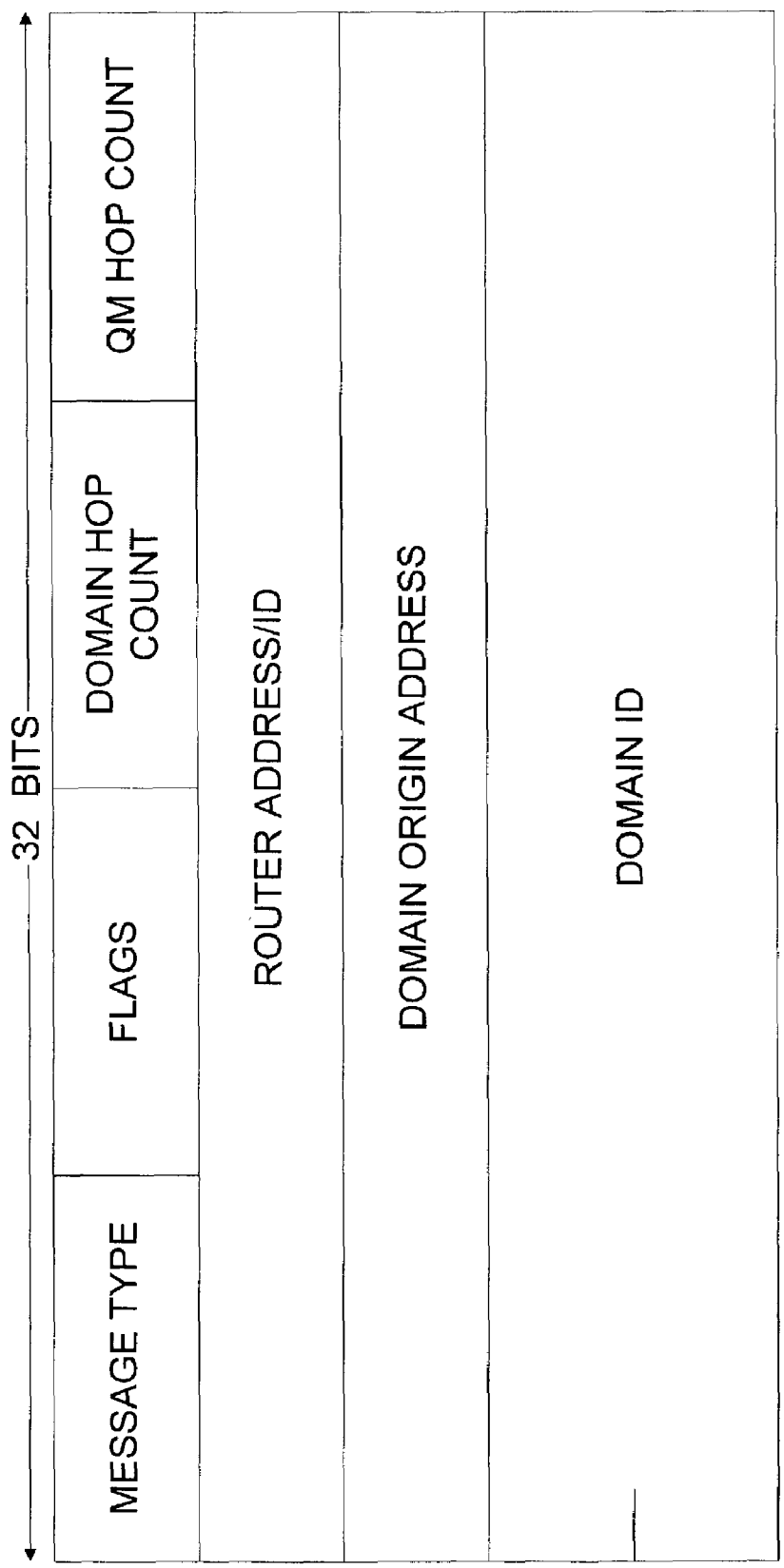
FIG. 24 is a diagram showing a Domain Organization Message.

The message packet format is as shown in FIG. 21, with the fields as defined below. The Release message is sent to the Successor QM or destination.

| | |
|---|---|
| Message Type | This is the message type as defined in Table 4. |
| Quality of Service | This field contains the quality of service that has been granted by the QM. |
| Bandwidth Reserved | This field contains the amount of bandwidth that was granted. |
| RID | The Reservation ID generated by this QM. |
| QID | The Request ID from PQID in pending request table of Release generator. |
| QM ID | The ID of the QM that Granted the reservation. |

6.1.7 Release Acknowledgement

The Release acknowledgement message is sent from the QM back to the Host. This lets the host know that the QM has received its release. If the Host does not get an acknowledgement back from the host, it will assume the QM has been disabled and try to find a new QM.

| | |
|---|---|
| Message Type | This is the message type as defined in Table 4. |
| Quality of Service | This field contains the quality of service that has been granted by the QM. |
| Bandwidth Reserved | This field contains the amount of bandwidth that was granted. |
| RID | The Reservation ID generated by this QM. |

6.1.8 RGP Time-Out

The RGP Time-Out message is sent from a QM to the predecessor, either a QM or host, when a Request has timed out. The message allows the QMs along the domain path to share information about the flow when possible.

| | |
|---|---|
| Message Type | This is the message type as defined in Table 4. |
| Quality of Service Requested | This field contains the QoS associated with the message that timed out. |
| Bandwidth Requested | This field contains the amount of bandwidth associated with the message that timed out. |
| QM ID | The ID of the QM that generated the Time-Out message. |
| RID | The Reservation ID generated by this QM if a Request refresh. This value is NULL if a new Request timed out. |
| QID | The Request Identification number generated by the sender of the Time-Out message if a Request timed out. |

6.2 Network Organization and Maintenance Messages

These messages are used to communicate between any of the elements of the network, between the source and destination of a data flow, two neighboring network elements, or between a router and its selected QoS Manager. This type of message is used to organize the network into domains, and maintain network performance.

6.2.1 Organization

This message is used when a router connects to the domain to pass state information between a Host and its neighbors. The host sends this message to its neighbors whenever it has a change in state.

| | |
|---|---|
| Message Type | This is the message type as defined in Table 4. |
| Domain Hop Count | The number of hops from the router sending the message to the QM acting as the domain origin. |
| QM Hop Count | The number of hops from the router sending the message to its QM. |
| Router Address/ID | The address or ID of the router that is sending the organization message. |
| Domain Origin Address | The address of the Domain Origin. |
| Domain ID | The ID of the domain on the other end of the link. |

6.2.2 Congestion Report and Clear

Figure 25:
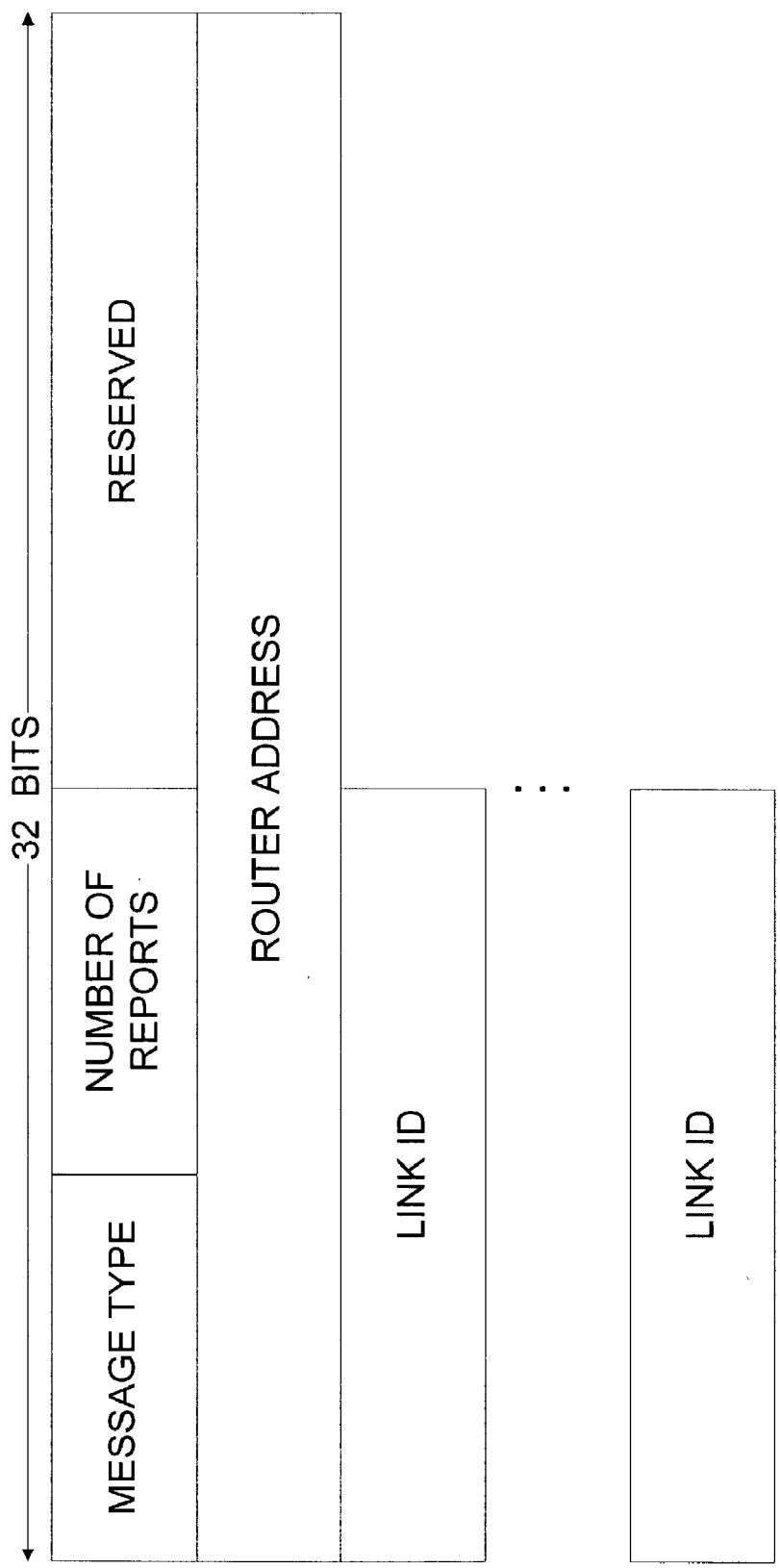
FIG. 25 is a diagram showing a Congestion Message.
Figure 26:
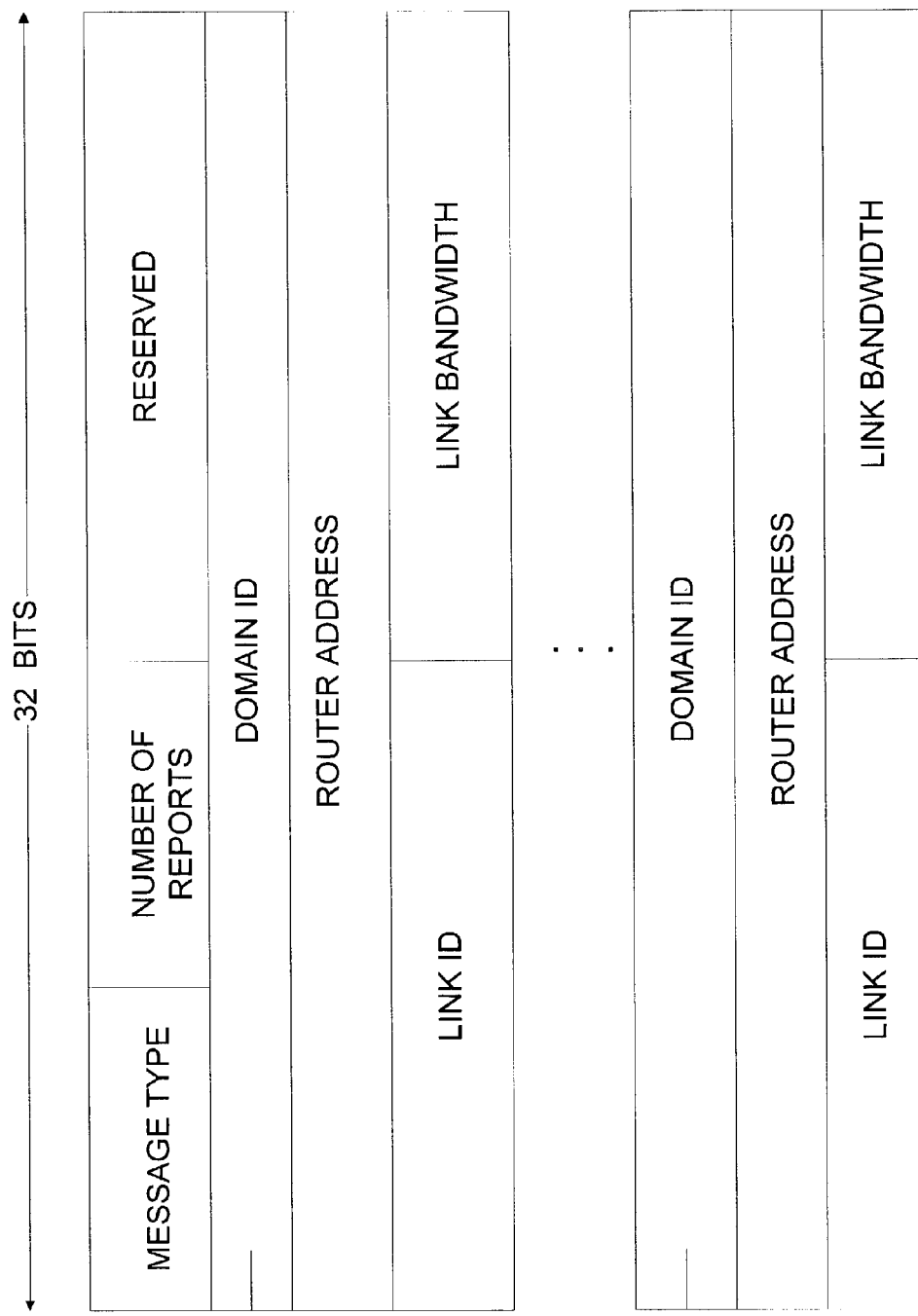
FIG. 26 is a diagram showing an ELR Message.
Figure 27:
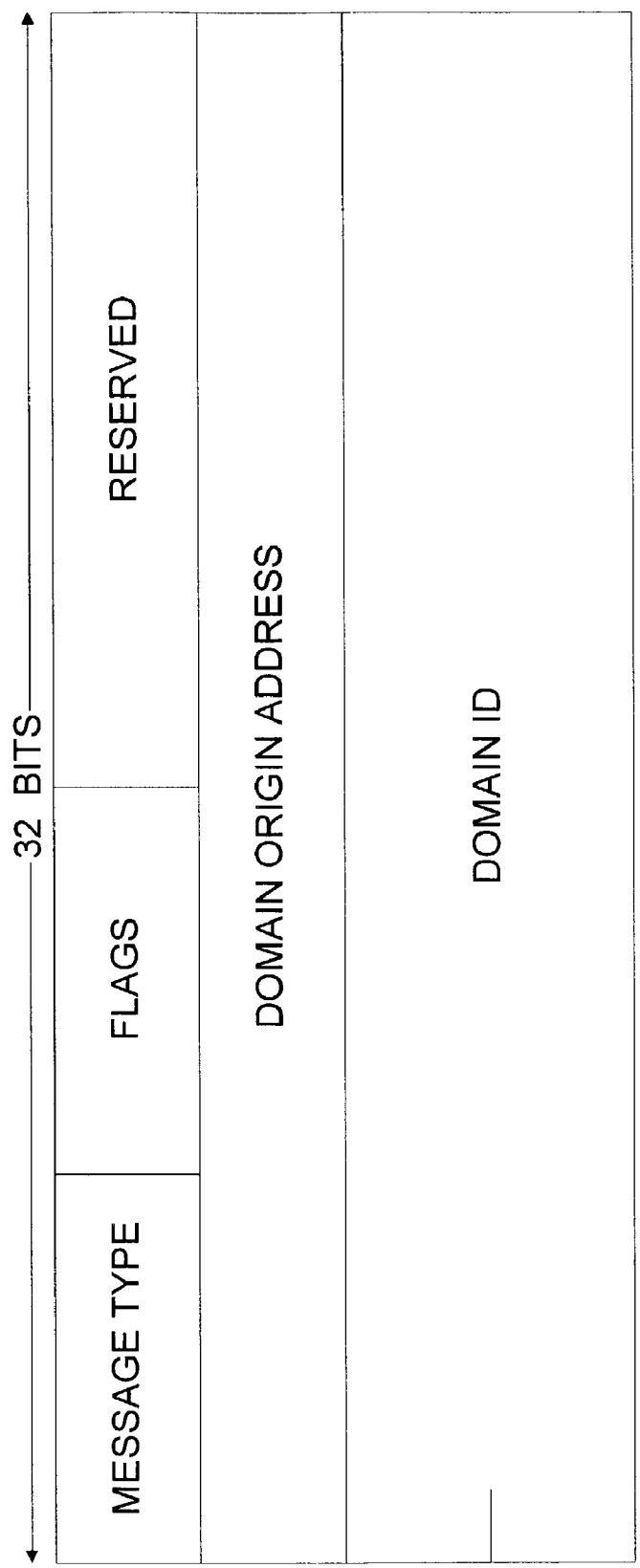
FIG. 27 is a diagram showing a Domain Origin Check Message.
Figure 28:
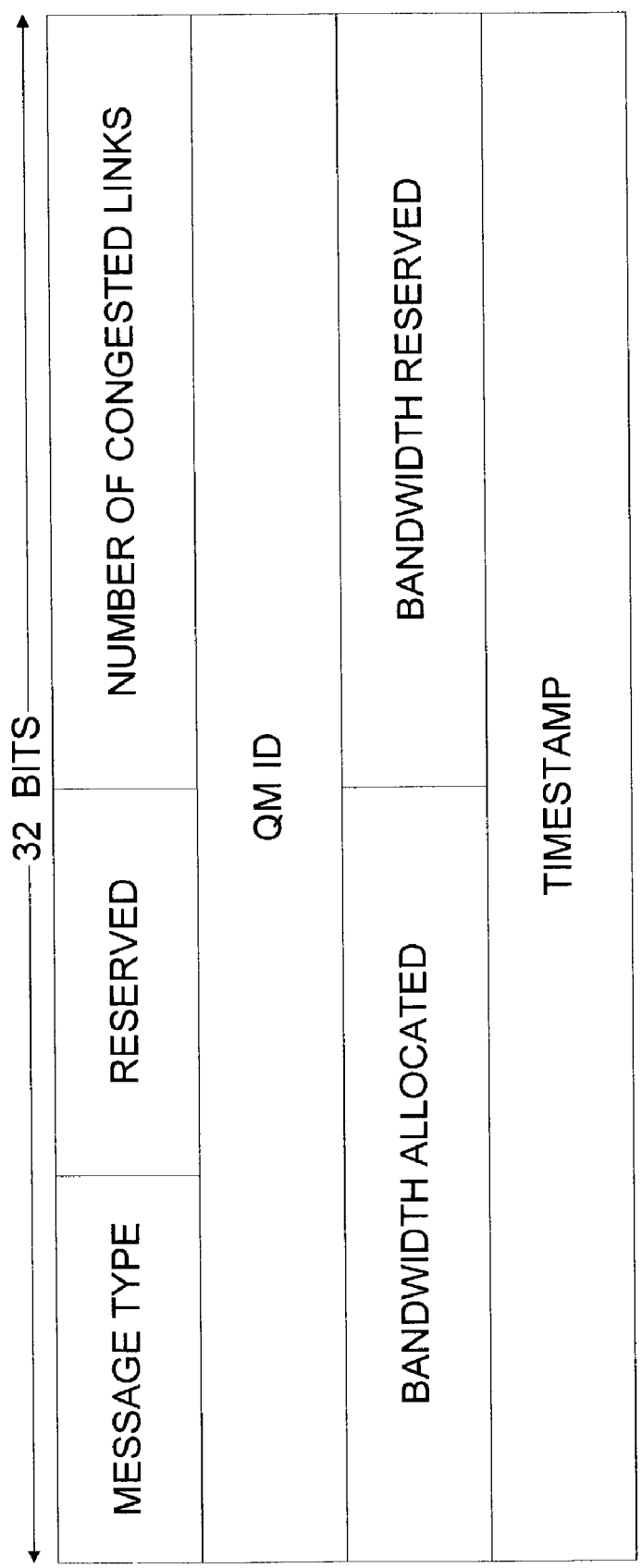
FIG. 28 is a diagram showing a QM Update Message.
Figure 29:
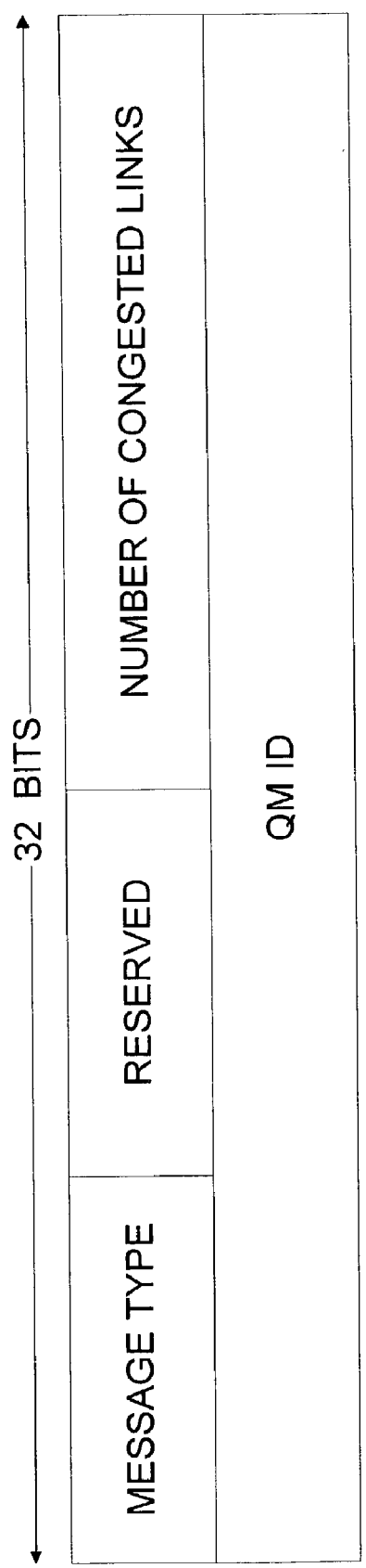
FIG. 29 is a diagram showing a QM Update Acknowledgment Message.
Figure 30:
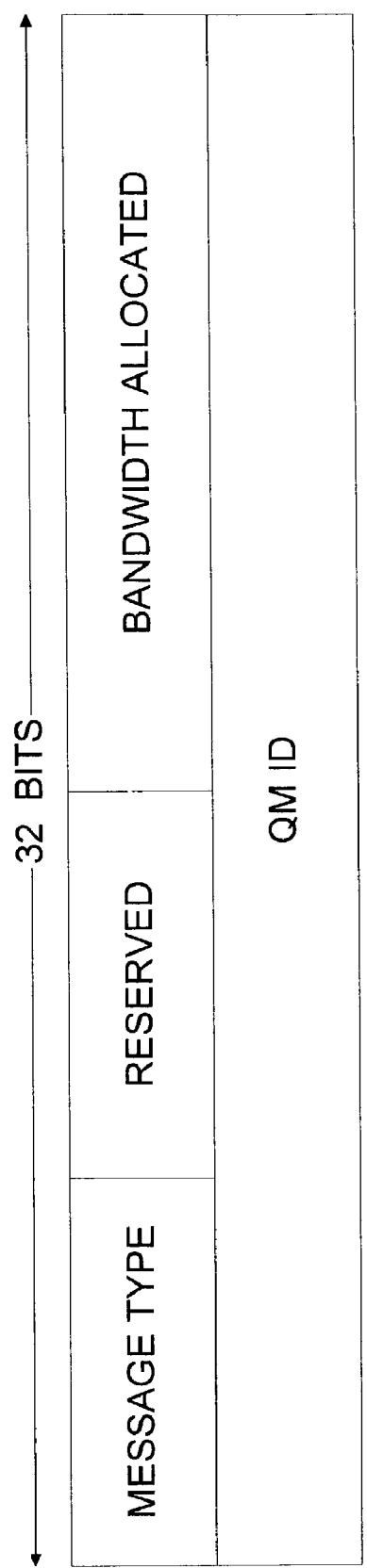
FIG. 30 is a diagram showing a QM Congestion Message.
Figure 31:
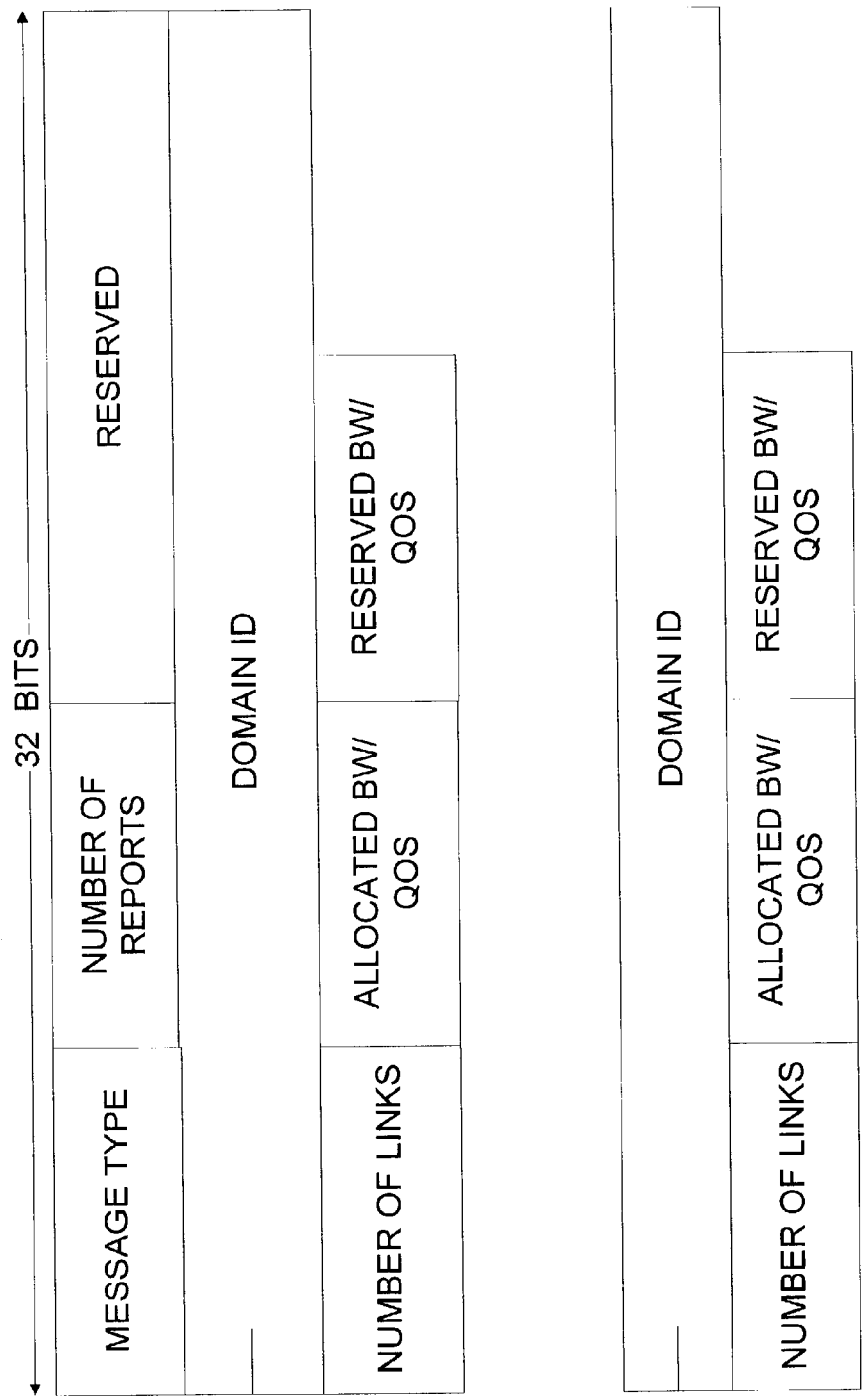
FIG. 31 is a diagram showing a Peripheral Domain Message.
Figure 32:
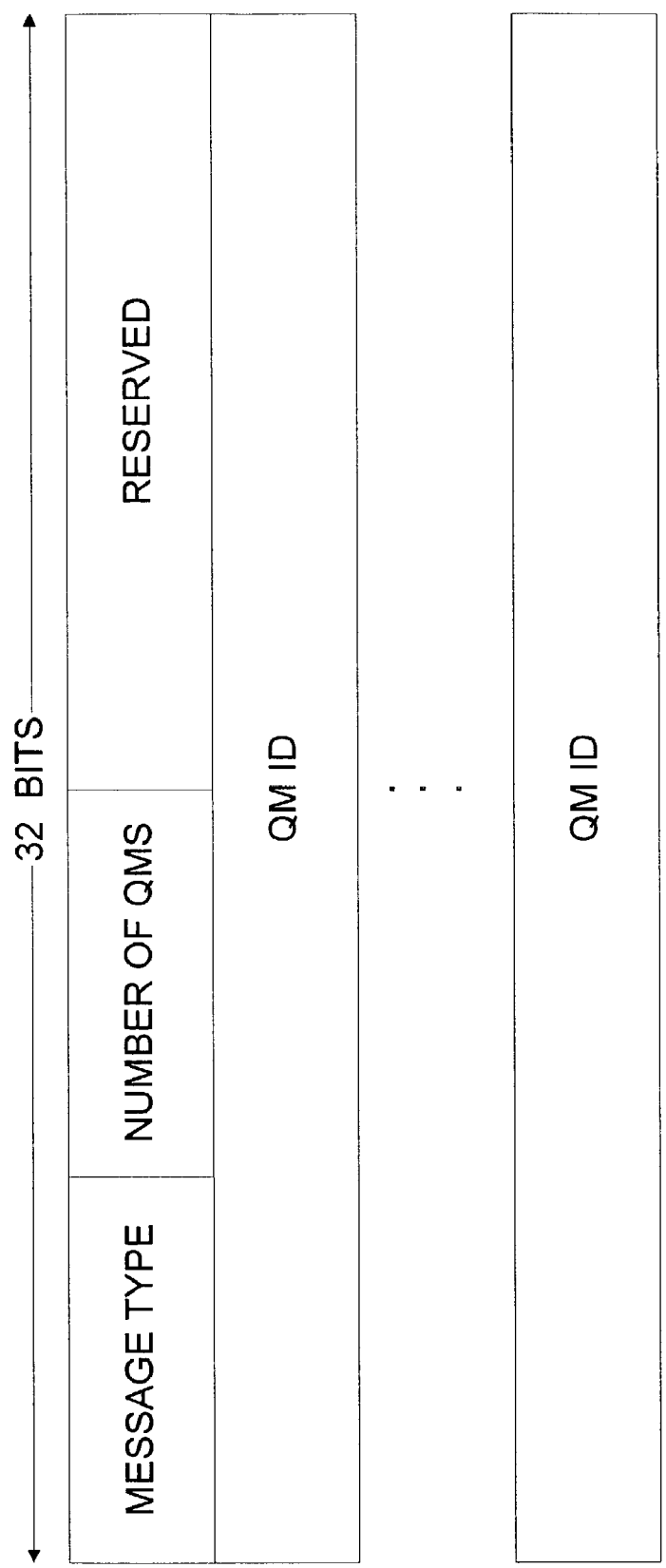
FIG. 32 is a diagram showing a QM List Message.
Figure 33:
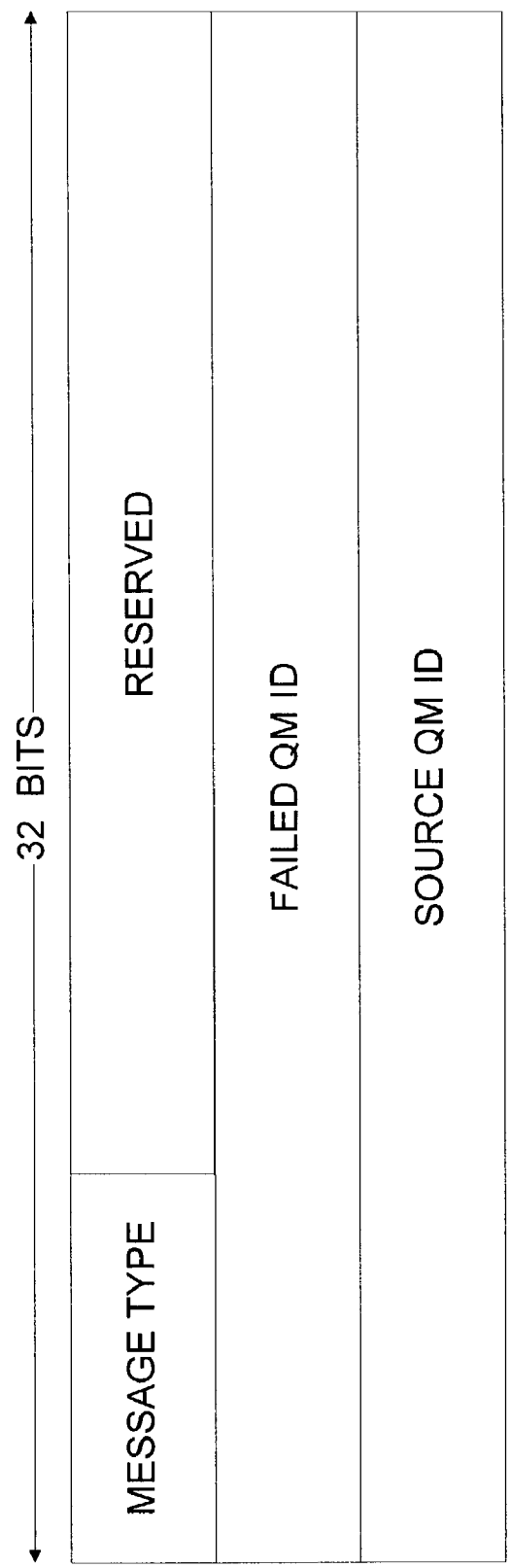
FIG. 33 is a diagram showing a Failed QM Message.
Figure 34:
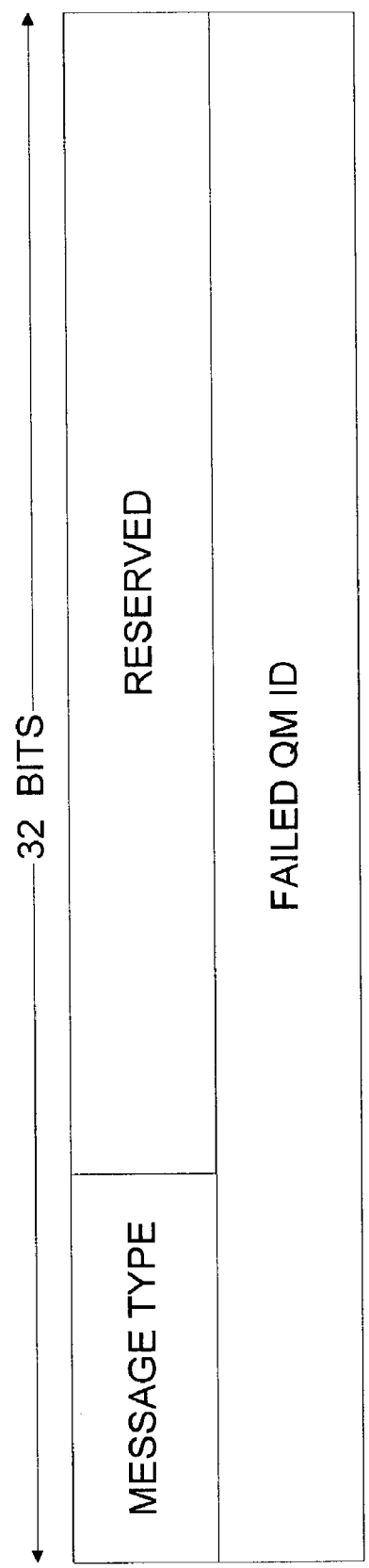
FIG. 34 is a diagram showing a Failed ACK Message.
Figure 35:
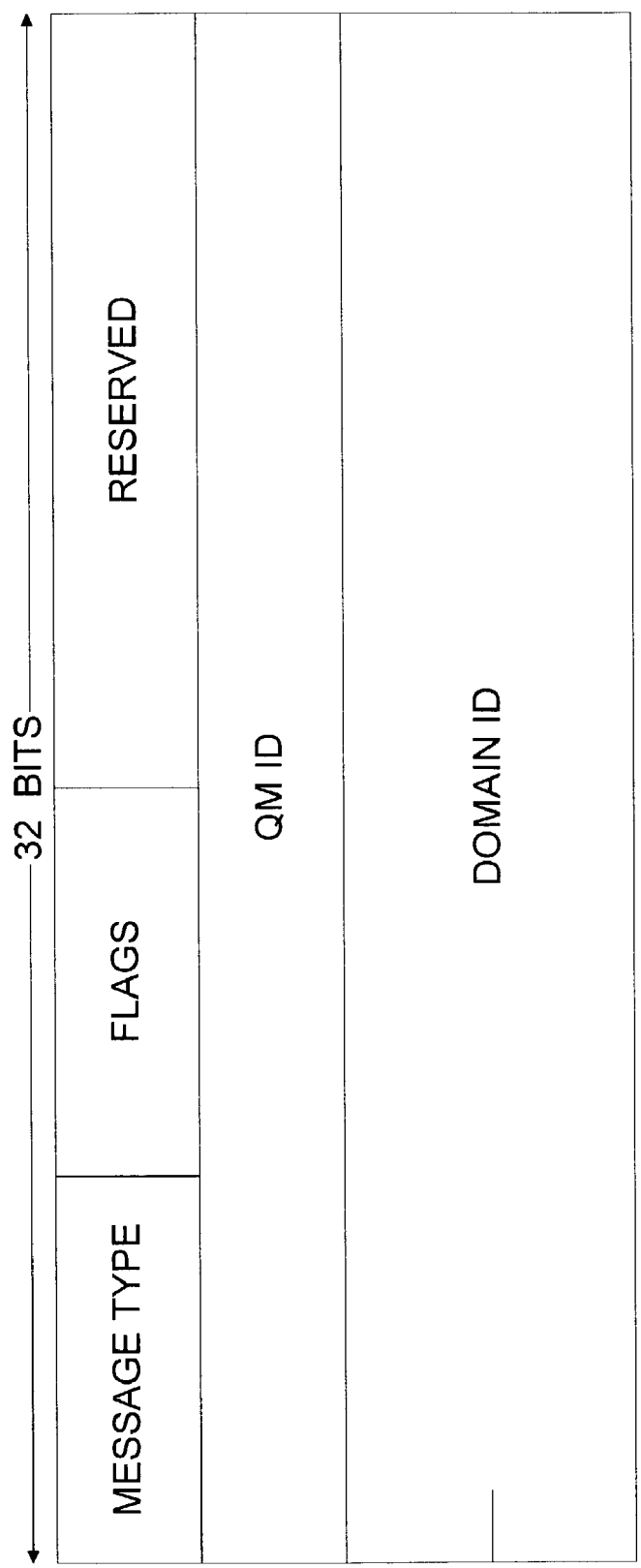
FIG. 35 is a diagram showing a QM Check Message.
Figure 36:
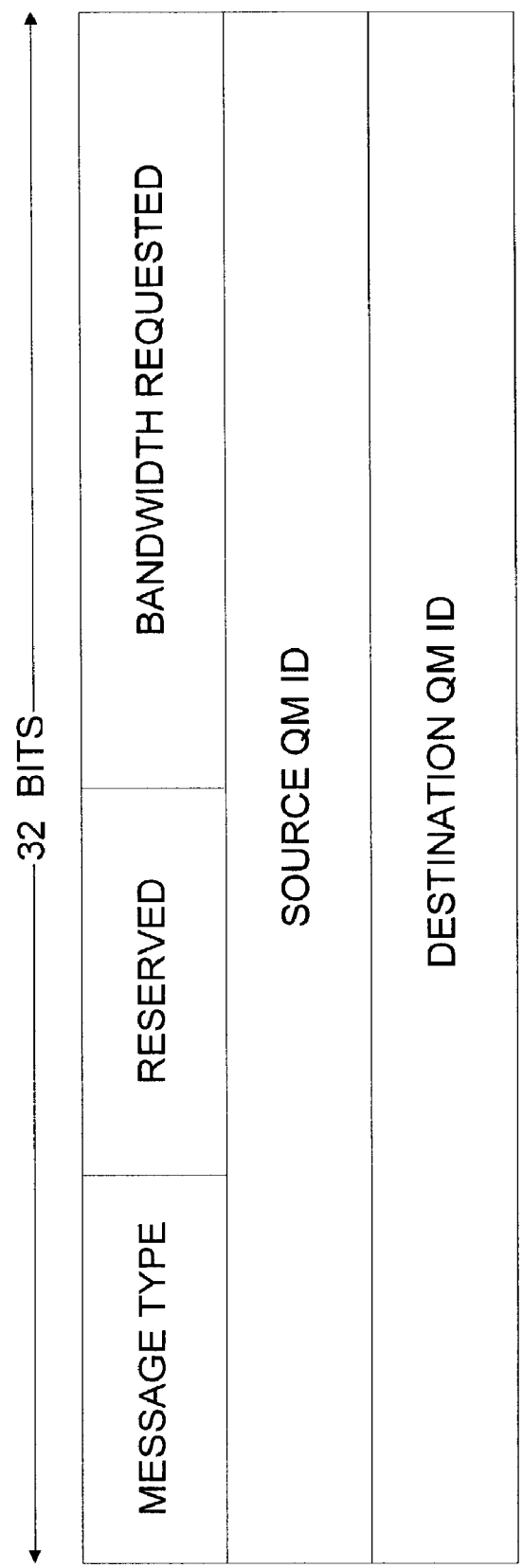
FIG. 36 is a diagram showing a QM Request Message.
Figure 37:
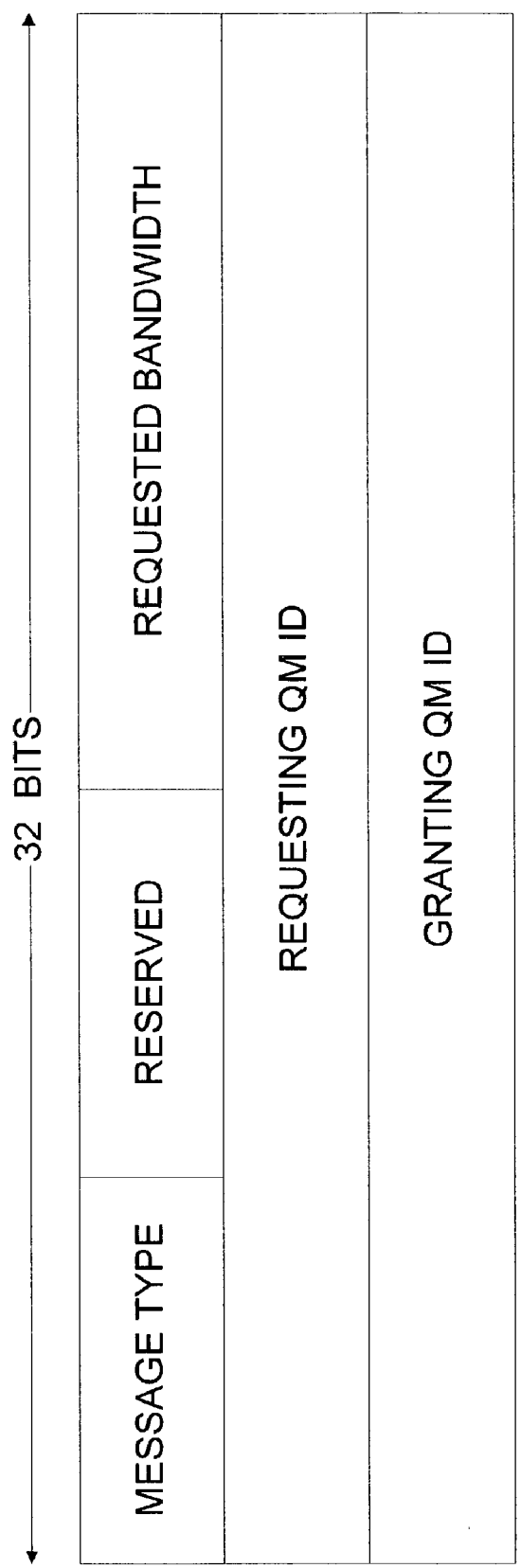
FIG. 37 is a diagram showing a QM Grant Message.
Figure 38:
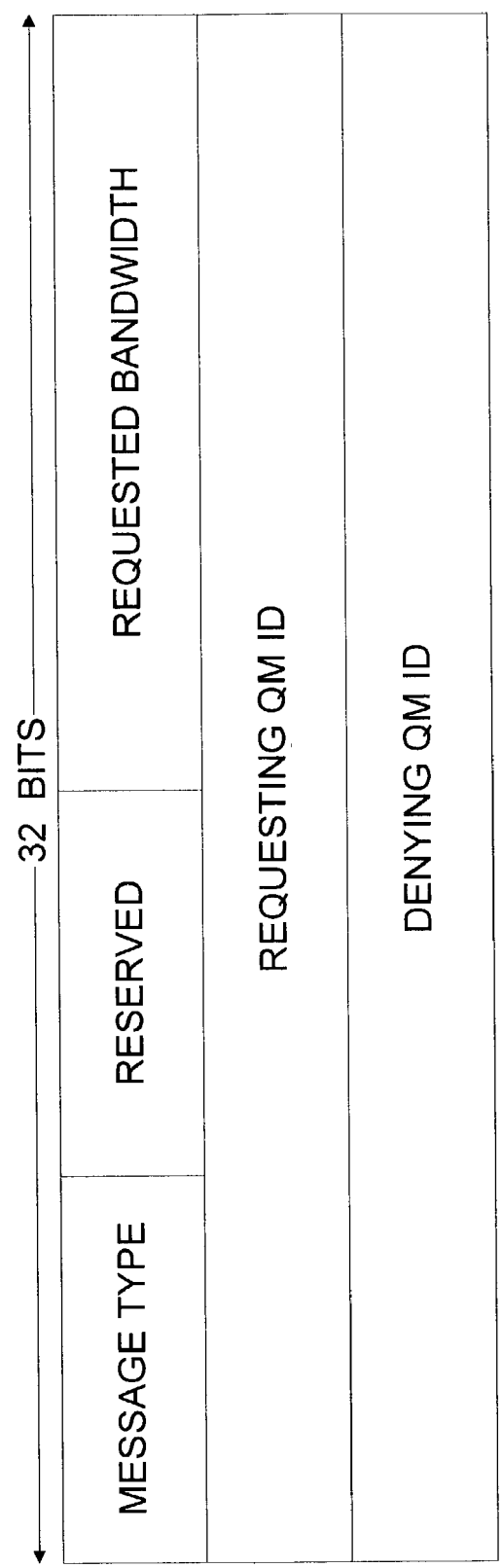
FIG. 38 is a diagram showing a QM Denial Message.
Figure 39:
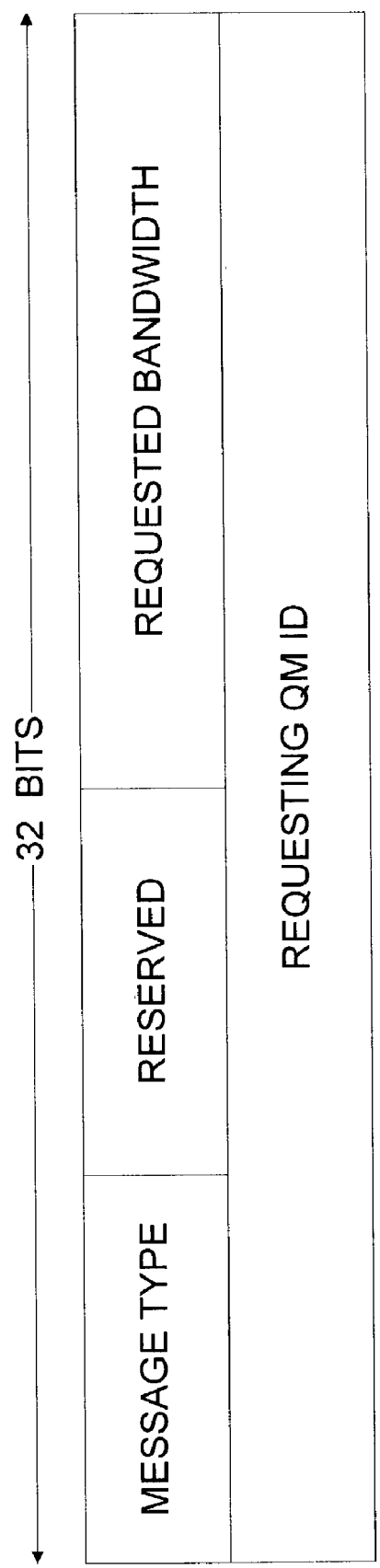
FIG. 39 is a diagram showing a QM ACK Message.

The congestion report and clear messages are sent from the routers to the QoS Manager. When a router becomes congested, it will generate a report, which will allow the QM to throttle back the amount of traffic being injected into the domain. Both of these messages use the same message format, shown in FIG. 25, and each is sent a single time. The congestion message is sent once every time that the traffic on the link exceeds the congestion threshold on a queue, and the congestion clear message is sent once when all the queues are below the clear threshold. Note that even though the same message format is used, there are different message types for the report and clear messages.

| | |
|---|---|
| Message Type | This is the message type as defined in Table 4. |
| Number of Reports | This field contains the number of reports from this router being delivered to the QM |
| Router Address | The address of the reporting router. |
| Link ID | The ID of the link, which, when combined with the router address, uniquely identifies the congested/uncongested link. |

6.2.3 External Link Registration

The external link registration (ELR) message is sent from the router to the QM to inform the QM of its existence and bandwidth capabilities.

| | |
|---|---|
| Message Type | This is the message type as defined in Table 4. |
| Number of Reports | The number of External Link Registrations being reported in this update. |
| Domain ID | The ID of the domain on the other end of the link. |
| Router Address | The address of the router that registered the external link. |
| Link ID | The ID of the link, which, when combined with the router address, uniquely identifies the external link. |
| Link Bandwidth | The Bandwidth of the external link. |

6.2.4 Domain Origin Check

This message is sent from a router to the Domain Origin when the origin is suspected of having moved from the domain. The origin responds to this message with an ACK only if it is still acting as the domain origin for this domain.

| | |
|---|---|
| Message Type | This is the message type as defined in Table 4. |
| Domain Origin Address | The address of the Domain Origin. |
| Domain ID | The ID of the domain on the other end of the link. |

6.3 Inter-QM Protocol Messages

These messages are exchanged between the QMs in the domain to share information needed on a domain-wide basis. This includes congestion information, the list of existing QMs, the amount of allocated and reserved bandwidth for each QM, information about the peripheral domains and the links to them, and a message to notify other QMs that there has been a loss of a QM in the domain. There is also a set of Inter-QM Request-Grant messages, which includes a QM Request, QM Grant, QM Denial, and QM ACK, which are used to exchange bandwidth.

6.3.1 QM Update

This report updates the other QMs about information stored in its own condition table. This information also carries a timestamp, which is used to measure the reliability of the data when a QM is no longer reachable.

| | |
|---|---|
| Message Type | This is the message type as defined in Table 4. |
| Number of Congested Links | This is the total number of congested links that have been reported to this QM. |
| QM ID | The ID of the QoS Manager to which the following information refers. |
| Bandwidth Allocated | The amount of bandwidth currently allocated to that QM |
| Bandwidth Reserved | The amount of bandwidth the QM currently has reserved. This should be less than Bandwidth Allocated, although, if the TDB has just been decremented, it may not be. |
| Timestamp | This is a timestamp, of when the reporting QM last received data from the QM that is being reported. This timestamp is UNIX time, the time in seconds since Jan. 1, 1970. |

6.3.2 QM Update Acknowledgement

This message is sent from one QoS Manager to another in acknowledgement of the QM Update. The ACK is similar to the beginning of the QM Update message, but changes the Message Type value and the QM ID.

| | |
|---|---|
| Message Type | This is the message type as defined in Table 4. |
| Number of Congested Links | This is the total number of congested links that have been reported to this QM (as shown in the Update message). |
| QM ID | The ID of the QM that generated the update_ack message. |

6.3.3 QM Congestion

This message is sent from a QM that is experiencing congestion to the other QMs in the domain to notify the other QMs that they need to decrement their TDB allocation.

| | |
|---|---|
| Message Type | This is the message type as defined in Table 4. |
| Bandwidth Allocated | The amount of bandwidth currently allocated to this QM. |
| QM ID | The ID of the QM that generated this QM Congestion message. |

6.3.4 Peripheral Domain

This report is sent to the other QMs so that each QM has a complete set of data on the domains peripheral to the local domain. The information included regarding allocated and reserved bandwidth is the total amount of bandwidth per QoS level over all the known connections existing in the QM's external link table.

| | |
|---|---|
| Message Type | This is the message type as defined in Table 4. |
| Number of Reports | The number of Peripheral Domain reports included in this update message. |
| Domain ID | The ID of the Peripheral Domain. |
| Connections Per Domain | The total number of connections to the Peripheral Domain. |
| Allocated BW/QoS | The total amount of BW allocated to this QM at each QoS level. |
| Reserved BW/QoS | The total amount of BW reserved by this QM at each QoS level. |

6.3.5 QM List

This message is used to inform other QMs about the list of known QMs within the domain that this QoS Manager is aware of.

| | |
|---|---|
| Message Type | This is the message type as defined in Table 4. |
| Number of QMs | The number of QoS Managers included in this update message. |
| QM ID | The ID of the QM. |

6.3.6 Failed QM

This message is sent to the domain origin and then to all the QMs in the domain to inform them that a failed QM has been detected.

| | |
|---|---|
| Message Type | This is the message type as defined in Table 4. |
| Failed QM ID | The ID of the Failed QM. |
| Source QM ID | The ID of the QM sending the message. |

6.3.7 Failed ACK

The domain origin uses this message to respond to the first Failed QM message, in Section 6.36, to inform the source of the Failed QM message that it may take control of the allocated bandwidth of that QM. Note that any subsequent Failed QM messages with the same QM ID are not ACKed.

| | |
|---|---|
| Message Type | This is the message type as defined in Table 4. |
| Failed QM ID | The ID of the Failed QM. |

6.3.8 QM Check

A QM sends this message when another QM in the same domain has possibly failed, or is no longer acting as a QM in this domain. If the QM is still active in the domain, the QM sends this message back to the source, with the Flags field set to 1.

| | |
|---|---|
| Message Type | This is the message type as defined in Table 4. |
| QM ID | The ID of the QM thought to have failed. |
| Domain ID | The ID of the domain. |

6.3.9 QM Request

This message is used by the QMs to request more bandwidth from each other. A QM may only request bandwidth from a QM that has more than 20% more allocated bandwidth than reserved.

| | |
|---|---|
| Message Type | This is the message type as defined in Table 4. |
| Bandwidth Requested | The amount of bandwidth requested of the Destination QM. |
| Source QM ID | The ID of the Requesting QM, the source of this message. |
| Destination QM ID | The ID of the QM the bandwidth is requested from, the destination of this message. |

6.3.10 QM Grant

This is the message sent in response to a QM Request if the QM that received the QM Request is able to give that amount of bandwidth to another QM.

| | |
|---|---|
| Message Type | This is the message type as defined in Table 4. |
| Requested Bandwidth | The amount of bandwidth requested. |
| Requesting QM ID | The ID of the Requesting QM. |
| Granting QM ID | The ID of the Granting QM. |

6.3.11 QM Denial

This is the message sent in response to a QM Request if the QM that received the QM Request is not able to fill the request. This might occur if Granting the bandwidth would drop the unreserved bandwidth to below 10% more than the amount of reserved bandwidth.

| | |
|---|---|
| Message Type | This is the message type as defined in Table 4. |
| Requested Bandwidth | The amount of bandwidth requested. |
| Requesting QM ID | The ID of the Requesting QM. |
| Denying QM ID | The ID of the Denying QM. |

6.3.12 QM ACK

The Requesting QM sends this message in response to a QM Grant and a QM Denial. Using a three-way handshake ensures that portions of the TDB are not lost if a message is not completed.

| | |
|---|---|
| Message Type | This is the message type as defined in Table 4. |
| Requested Bandwidth | The amount of bandwidth requested. |
| Requesting QM ID | The ID of the Requesting QM. |

Appendix A Modifications for Subnetwork or Other Operation

Figure 40:
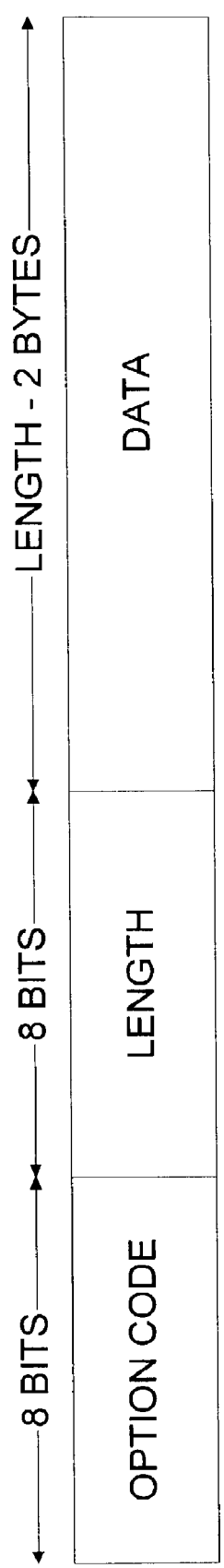
FIG. 40 is a diagram showing an IP Header Option Field Format.

There are two modifications that have been specified as modifications made to this mechanism to make it usable by subnetworks that need information other than the DS codepoint to successfully provide meaningful QoS to the data packets. Information such as the allotted bandwidth or flow identification can be included in the IP header using a specified option field, which is specified in RFC 791, and formatted as shown in FIG. 40.

A.1 QoS Bandwidth Option Field

This option allows the IP header of the data packets to include the amount of bandwidth the flow is allowed to use in the network. The information included in the Grant message of the DS/DQM mechanism would be used to format this option field in the data packets if necessary.

Figure 41:
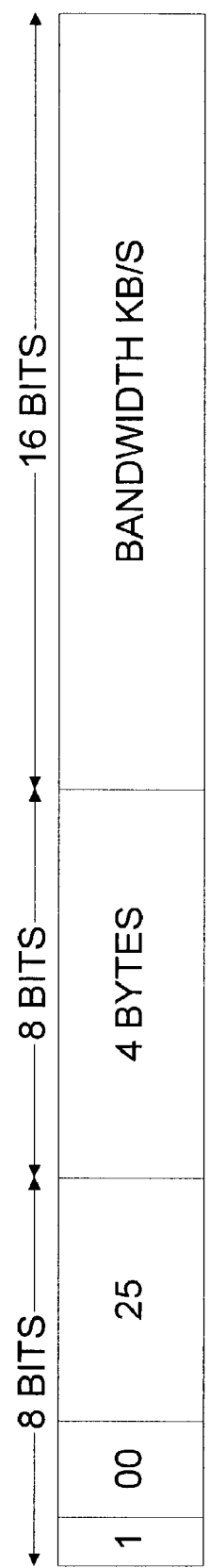
FIG. 41 is a diagram showing an IP Option Field.

The Option Code byte contains three sub-fields. The first is the "copy bit" and is set to 1 to indicate that this field should be copied into each fragment of the packet if the packet needs to be fragmented. The second sub-field is the two bit "class" field and is set to 0 to indicate that this is used for a normal or control operation. The last sub-field contains the actual control code and is set by the IANA. At this time, the values 0-24 have been assigned, and so it will be assumed that if approved, this option would receive that value 25, which is the next available option code. Therefore, the Option Code field has a total value of 153, and looks as shown in FIG. 41.

The length field contains the total number of bytes of the option, including the option code and length fields. Hence, the value for this option is 4 bytes.

The Data field for this option is 16 bits long and will contain the bandwidth allotted for this data flow, with a granularity of Kb/s. Therefore, the range of bandwidth that this option is able to support is from 1 Kb/s to 64 Mb/s.

A.2 QoS Flow ID Option Field

This option allows the data packets to include assigned flow identification numbers in the IP header. However, this option has not been fully developed.

Networks that support the use of IntServ to provide QoS would use this option, since per flow information needs to be maintained across the IntServ network. If encryption is used in the network, the port addresses are encrypted also, and the routers are not able to properly route the packets according to the reserved path. Therefore, the flow ID option field can be used to store the port numbers or a flow ID in the IP header, so that each router can relate the data packet to its appropriate reserved path.

Throughout this description, reference is made to mobile networks and to an IP network, because it is believed that the beneficial aspects of the present invention would be most readily apparent when used in connection with mobile IP networks; however, it should be understood that the present invention is not intended to be limited to mobile IP networks and should be hereby construed to include other non-mobile and non-IP networks as well.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:

1. A network system comprising:
   a network, comprising:
   a plurality of routers;
   said plurality of routers operating as a differentiated services domain;
   where data packet markings are used by the plurality of routers to prioritize data forwarding within the differentiated services domain to any other of said plurality of routers and where data forwarding within said differentiated services domain is done without reserving a path through said differentiated services domain;
   a quality of service managing computer coupled to said network and also being assigned to said domain; wherein the quality of service managing computer is not co-extensive with any one of said plurality of routers;
   said quality of service managing computer being configured to communicate with said plurality of routers and further configured to determine whether data to be transmitted within said domain can be granted access to all of said domain without reserving a path through said differentiated services domain and with an associated predetermined quality of service level of a quality of service scheme;
   wherein said quality of service managing computer utilizes a congestion report issued by and sent from any of said plurality of routers only when network congestion occurs, to aid in adjusting a variable estimation of an actual domain capacity for said domain;
   network congestion occurs when demand for access to a portion of the network exceeds an actual capacity of the portion of the network;
   wherein said variable estimation of the actual domain capacity is used by said quality of service managing computer to make a determination on granting access to said domain;
   wherein said quality of service scheme is a multi-level quality of service scheme;
   said network is an internet protocol network;
   said plurality of routers each monitors usage of an output link associated therewith; and when each of said plurality of routers detects congestion, a congestion report indicating congestion is sent to said quality of service managing computer;
   wherein said quality of service managing computer is configured to monitor an amount which represents a total reserved bandwidth for said domain;
   wherein said variable estimation of an actual domain capacity is a variable estimation of a total domain bandwidth which comprises both used domain bandwidth and unused domain bandwidth; and
   wherein said quality of service managing computer is configured to downwardly adjust said variable estimation of a total domain bandwidth when said total reserved bandwidth is less than said variable estimation of a total domain bandwidth and a first predetermined threshold of congestion has been exceeded.

2. A network system of claim 1 wherein said quality of service managing computer is configured to upwardly adjust said variable estimation of a total domain bandwidth when said total reserved bandwidth is at said variable estimation of a total domain bandwidth and where congestion on said network is below a second predetermined threshold.

3. A network system of claim 2 wherein said first predetermined threshold and said second predetermined threshold are equal.

4. A network system of claim 2 further comprising another quality of service managing computer assigned to said domain, where said quality of service managing computer and said another quality of service managing computer are not completely redundant and are configured to allocate therebetween the variable estimation of a total domain bandwidth for said domain.

5. A network system of claim 4 wherein said quality of service managing computer is configured to not grant access to said domain beyond an amount of said variable estimation of a total domain bandwidth which has been previously allocated thereto.

6. A network of claim 5 wherein said domain is a dynamic domain and said quality of service managing computer is a mobile computer.

7. A network of claim 6 wherein, when a bottleneck is indicated by a localized level of congestion within the domain exceeding a predetermined threshold, said domain is dynamically split into two separate domains.

8. A network system comprising:
a network;
a plurality of routers coupled to said network;
said plurality of routers being assigned to a differentiated services domain;
where data packet markings are used by the plurality of routers to prioritize data forwarding within the differentiated services domain to any other of said plurality of routers and where data forwarding within said differentiated services domain is done without reserving a path through said differentiated services domain;
a plurality of quality of service managing computers coupled to said network and also being assigned to said domain; wherein the quality of service managing computer is not co-extensive with any one of said plurality of routers;
each of said quality of service managing computers being configured to communicate with at least one of said plurality of routers and further configured to determine whether data to be transmitted within said domain can be granted access to all of said domain without reserving a path through said domain and with an associated predetermined quality of service level of a quality of service scheme;
wherein said plurality of quality of service managing computers act as independent bandwidth brokers, and each of said plurality of quality of service managing computers being configured to grant access to said domain for only a portion of a total domain bandwidth which has been previously allocated to said each of said plurality of quality of service managing computers;
wherein said quality of service scheme is a multi-level quality of service scheme;
said network is an internet protocol network;
said plurality of quality of service managing computers are not configured to be fully redundant and are configured to exchange only a summary of information relating to activities of said plurality of quality of service managing computers;
wherein each of said plurality of quality of service managing computers is configured to request a transfer of allocated total domain bandwidth from another of said plurality of quality of service managing computers; and
wherein each of said plurality of quality of service managing computers is configured to utilize feedback of network congestion to make domain access grants.

9. A network system of claim 8 wherein said domain is a dynamic domain which bifurcates when a localized congestion within said domain exceeds a predetermined threshold.

10. A network system comprising:
an internet protocol network;
a plurality of routers coupled to said network;
said plurality of routers being assigned to a differentiated services domain;
where data packet markings are used by the plurality of routers to prioritize data forwarding within the differentiated services domain to any other of said plurality of routers and where data forwarding within said differentiated services domain is done without reserving a path through said differentiated services domain;
a plurality of quality of service managing computers coupled to said network and also being assigned to said domain; wherein none of the plurality of quality of service managing computers are co-extensive with any one of said plurality of routers;
said plurality of quality of service managing computers being configured to communicate with said plurality of routers and further configured to determine whether data to be transmitted within said domain can be granted access to all of said domain without reserving a path through said domain and with an associated predetermined quality of service level of a quality of service scheme;
wherein said plurality of quality of service managing computers are further configured to monitor a dynamic state within said domain and to recognize isolated areas of excessive levels of said dynamic state and in response to a determination of localized levels of said dynamic state in excess of a predetermined threshold, assist in a dynamic reconfiguration of said domain;
said dynamic state relates to network congestion;
network congestion occurs when demand for access to a portion of the internet protocol network exceeds an actual capacity of the portion of the internet protocol network;
wherein said quality of service scheme is a multi-level quality of service scheme;
said dynamic reconfiguration is one of a splitting of a domain and a merging of domains;
at least one of said plurality of quality of service managing computers utilizes network congestion feedback information to aid in adjusting a variable estimation of a total domain bandwidth for said domain; and,
wherein said variable estimation of a total domain bandwidth is used by said at least one of said plurality of quality of service managing computers to make a determination on granting access to said domain.

11. A quality of service network comprising:
means for routing data to and from a predetermined destination;
means for granting access to all of said domain, without reserving a path through said domain, and for limiting access to an amount based upon a variable estimation of a total domain bandwidth;

means for making changes in said variable estimation of a total domain bandwidth based upon network congestion;

means for dynamically splitting said domain in response to localized congestion with said domain; and where network congestion and localized congestion each exist only when a demand exceeds a capacity to meet the demand.

12. A method of providing quality of service levels on a network comprising the steps of:

providing a plurality of non-fully redundant quality of service managing computers which are configured to limit access without reserving a path through said domain and to a differentiated services domain based upon:

a total reserved bandwidth in comparison to a variable estimation of a total domain bandwidth;

a congestion feedback mechanism for adjusting said variable estimation of a total domain bandwidth;

making a determination as to whether a localized area of congestion exists within said domain;

dynamically reconfiguring said domain in response to said determination; and wherein congestion exists only when a demand exceeds a capacity to meet the demand.

13. A method of claim 12 wherein:

said step of dynamically reconfiguring said domain comprises a step of merging a first plurality of domains into a second plurality of domains which has fewer domains than said first plurality of domains; and said plurality of non-fully redundant quality of service managing computers are configured to communicate using an internet protocol.

14. The network comprising:

a plurality of routers providing a routing mechanism and implementing a quality of service (QoS) mechanism on a differentiated services domain;

where data packet markings are used by the plurality of routers to prioritize data forwarding within the differentiated services domain to any other of said plurality of routers and where data forwarding within said differentiated services domain is done without reserving a path through said differentiated services domain;

wherein a first subset of said plurality of routers is designated as a plurality of QoS managers;

a second subset of said plurality of routers which specifically excludes the first subset, each router in said second subset sends reports to one of said plurality of QoS managers;

each of said plurality of QoS managers is configured to provide an admission control mechanism to regulate traffic admitted to the differentiated services domain;

wherein each of said plurality of QoS managers maintains its own estimate of a domain-wide capacity to carry traffic and receive reports;

wherein said reports are issued after an occurrence of a predetermined event;

wherein said estimate of a domain-wide capacity is made by a method comprising the steps of:

a QoS manager makes an initial estimate of a domain-wide collective capacity;

the initial estimate of the domain-wide collective capacity is reduced when congestion reports are received;

the initial estimate of a domain-wide collective capacity is increased when reserved capacity nearly equals the initial estimate of domain-wide collective capacity and congestion reports are not being received; and where congestion exists only when a demand exceeds a capacity to meet the demand.

15. The network of claim 14 wherein said admission control mechanism is a method of a request-grant protocol wherein:

a traffic originating router sends a request message through the network to a traffic terminating router; and a QoS manager admits, denies, or partially denies the traffic resulting in respectively a grant, denial, or partial denial message being returned to the traffic originating router.

16. The network of claim 15 wherein said traffic originating router subsequently polices the grant to ensure that a requesting application does not exceed a granted capacity, by delaying, or destroying, or notifying a sending application of traffic in excess of the granted capacity.

17. The network of claim 16 in which the grant automatically expires after a predetermined period.

18. The network of claim 17 in which said traffic originating router automatically refreshes the grant by repeating the request-grant protocol.

19. The network of claim 14 wherein a QoS manager recognizes that another QoS manager is within a predetermined number of hops and then ceases to be a QoS manager.

20. The network of claim 14 wherein said plurality of routers comprises all of the routers in the network.

* * * * *